(12) United States Patent
Yu et al.

(10) Patent No.: US 9,435,924 B2
(45) Date of Patent: Sep. 6, 2016

(54) NANOSTRUCTURED ARTICLES

(75) Inventors: Ta-Hua Yu, Woodbury, MN (US);
Moses M. David, Woodbury, MN (US);
Kalc C. Vang, West Lakeland, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 0 days.

(21) Appl. No.: 14/003,923

(22) PCT Filed: Mar. 5, 2012

(86) PCT No.: PCT/US2012/027717
§ 371 (c)(1),
(2), (4) Date: Sep. 9, 2013

(87) PCT Pub. No.: WO2012/125324
PCT Pub. Date: Sep. 20, 2012

(65) Prior Publication Data
US 2013/0344290 A1     Dec. 26, 2013

Related U.S. Application Data

(60) Provisional application No. 61/452,430, filed on Mar. 14, 2011.

(51) Int. Cl.
*G02B 5/30* (2006.01)
*G02B 1/00* (2006.01)
(Continued)

(52) U.S. Cl.
CPC ............. *G02B 5/3025* (2013.01); *B82Y 20/00* (2013.01); *C09D 4/00* (2013.01); *C09D 5/006* (2013.01);
(Continued)

(58) Field of Classification Search
CPC ................ G02B 1/118; G02B 5/3025; G02B 2207/101; C09D 4/00; C09D 5/006; C09D 7/1266; B82Y 20/00; Y10T 428/24355; Y10T 428/24364
USPC ................................................. 428/141, 142
See application file for complete search history.

(56) References Cited

U.S. PATENT DOCUMENTS

| 4,374,158 A | 2/1983 | Taniguchi |
| 4,816,333 A | 3/1989 | Lange |

(Continued)

FOREIGN PATENT DOCUMENTS

| EP | 1479734 | 11/2004 |
| JP | 2002-241527 | 8/2002 |

(Continued)

OTHER PUBLICATIONS

Gilbert, "Comparison of ITO Sputtering Process from Ceramic and Alloy Targets onto Room Temperature PET Substrates", Society of Vacuum Coaters, 36th Annual Technical Conference Proceedings, 1993, pp. 236-241.

(Continued)

*Primary Examiner* — Nathan Van Sell
(74) *Attorney, Agent, or Firm* — Gregory D. Allen

(57) ABSTRACT

Articles comprising a substrate and a first layer on a major surface thereof, wherein the first layer has a first random, nanostructured surface, and wherein the first layer has an average thickness up to 0.5 micrometer. Embodiments of the articles are useful, for example, for display applications (e.g., liquid crystal displays (LCD), light emitting diode (LED) displays, or plasma displays); light extraction; electromagnetic interference (EMI) shielding; ophthalmic lenses; face shielding lenses or films; window films; anti-reflection for construction applications; and, construction applications or traffic signs.

15 Claims, 4 Drawing Sheets

(51) Int. Cl.
 *C09D 4/00* (2006.01)
 *G02B 1/118* (2015.01)
 *C09D 5/00* (2006.01)
 *C09D 7/12* (2006.01)
 *B82Y 20/00* (2011.01)

(52) U.S. Cl.
 CPC ............ *C09D 7/1266* (2013.01); *G02B 1/118* (2013.01); *G02B 2207/101* (2013.01); *Y10T 428/24355* (2015.01); *Y10T 428/24364* (2015.01)

(56) References Cited

U.S. PATENT DOCUMENTS

| | | | |
|---|---|---|---|
| 5,674,592 | A | 10/1997 | Clark |
| 5,825,543 | A | 10/1998 | Ouderkirk |
| 5,867,316 | A | 2/1999 | Carlson |
| 5,882,774 | A | 3/1999 | Jonza |
| 5,888,594 | A | 3/1999 | David |
| 6,352,761 | B1 | 3/2002 | Hebrink |
| 6,368,699 | B1 | 4/2002 | Gilbert |
| 6,376,590 | B2 | 4/2002 | Kolb |
| 6,645,843 | B2 | 11/2003 | Kim |
| 6,927,900 | B2 | 8/2005 | Liu |
| 7,332,213 | B2 | 2/2008 | Mimura |
| 7,368,161 | B2 | 5/2008 | McGurran |
| 7,374,812 | B2 | 5/2008 | Mizuno |
| 7,378,136 | B2 | 5/2008 | Pokorny |
| 7,604,381 | B2 | 10/2009 | Hebrink |
| 8,137,801 | B2 | 3/2012 | Walker, Jr. |
| 8,192,639 | B2 | 6/2012 | Schulz |
| 8,350,451 | B2 | 1/2013 | Bright |
| 8,470,439 | B2 | 6/2013 | Walker, Jr. |
| 2001/0013668 | A1 | 8/2001 | Neavin |
| 2004/0071937 | A1 | 4/2004 | Chien |
| 2005/0233083 | A1 | 10/2005 | Schulz |
| 2006/0050199 | A1* | 3/2006 | Hsu et al. ............ 349/64 |
| 2006/0074172 | A1 | 4/2006 | Yang |
| 2006/0084780 | A1 | 4/2006 | Hebrink |
| 2007/0059490 | A1 | 3/2007 | Kaneko |
| 2007/0166513 | A1* | 7/2007 | Sheng ............ B05D 5/04 428/141 |
| 2009/0045739 | A1* | 2/2009 | Kho et al. ............ 313/504 |
| 2009/0087629 | A1 | 4/2009 | Everaerts |
| 2009/0186209 | A1 | 7/2009 | Padiyath |
| 2009/0229732 | A1 | 9/2009 | Determan |
| 2010/0028564 | A1 | 2/2010 | Cheng |
| 2010/0040842 | A1 | 2/2010 | Everaerts |
| 2010/0150513 | A1* | 6/2010 | Zhang et al. ............ 385/131 |
| 2010/0165276 | A1 | 7/2010 | David |
| 2012/0328829 | A1 | 12/2012 | Vang |
| 2013/0003179 | A1 | 1/2013 | Vang |
| 2014/0004304 | A1 | 1/2014 | Yu |

FOREIGN PATENT DOCUMENTS

| | | |
|---|---|---|
| JP | 2002-265649 | 9/2002 |
| JP | 2003-205563 | 7/2003 |
| JP | 2008-197670 | 8/2008 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 99/36248 | 7/1999 |
| WO | WO 99/36262 | 7/1999 |
| WO | WO 2008/128073 | 10/2008 |
| WO | WO 2009/114683 | 9/2009 |
| WO | WO 2010/078071 | 7/2010 |
| WO | WO 2010/078306 | 7/2010 |
| WO | WO 2010/078346 | 7/2010 |
| WO | WO 2010/123528 | 10/2010 |

OTHER PUBLICATIONS

Ma, "Preparation and properties of indium tin oxide films deposited on polyester substrates by reactive evaporation", Thin Solid Films, 1997, vol. 307, pp. 200-202.

Minami, "Physics of very thin ITO conducting films with high transparency prepared by DC magnetron sputtering", Thin Solid Film, 1995, vol. 270, pp. 37-42.

Skotheim, Handbook of Conducting Polymers, Second Edition, Marcel Dekker, Inc., pp. 7-12 (1998).

International Search Report for PCT/US2012/027717, 3 pages.

Office Action dated Sep. 17, 2015, Chinese application that claims priority to the same PCT Application (i.e., PCT/US2012/027717) as the instant U.S. Application.

*The Structure and Properties of Metallic Materials*, Weimin Mao et al., "Reflection of Light", Tsinghua University Press, Feb. 29, 2008, p. 365.

* cited by examiner

NANOSTRUCTURED ARTICLES

CROSS REFERENCE TO RELATED APPLICATION

This application claims the benefit of U.S. Provisional Patent Application No. 61/452,430 filed Mar. 14, 2011, the disclosure of which is incorporated by reference herein in its entirety.

BACKGROUND

When light travels from one medium to another, some portion of the light is reflected from the interface between the two media. For example, typically about 4-5% of the light shining on a clear plastic substrate is reflected at the top surface.

Different approaches have been employed to reduce the reflection of polymeric materials. One approach is to use antireflective coatings such as multilayer reflective coatings consisting of transparent thin film structures with alternating layers of contrasting refractive index to reduce reflection. It is difficult, however, to achieve broadband antireflection using the multilayer antireflective coating technology.

Another approach involves using subwavelength surface structure (e.g., subwavelength scale surface gratings) for broadband antireflection. Methods for creating the subwavelength surface structure such as by lithography, tend to be relatively complicated and expensive. Additionally, it is challenging to obtain consistent low reflection broadband antireflection with minimized higher order diffraction from a roll-to-roll process with subwavelength scale surface gratings. A solution to provide high performance, low interference fringing, is desired, as is one also having relatively low reflection (i.e., average reflection over the visible range less than 0.5 percent), low birefringence (i.e., having an optical retardation value of less than 200 nm), and antireflective characteristics.

SUMMARY

In one aspect, the present disclosure describes an article comprising a substrate having first major surface and second, generally opposed major surfaces, and a first layer on the first major surface, wherein the first layer has a first random, nanostructured surface, and wherein the first layer has an average thickness up to 0.5 micrometer (in some embodiments, up to 0.4 micrometer, 0.3 micrometer, 0.25 micrometer, 0.2 micrometer, 0.15 micrometer, 0.1 micrometer, or even up to 0.075 micrometer).

In some embodiments, articles described herein exhibit an interference fringing appearance between the first layer and the first major surface of the substrate that is reduced by at least 50 (in some embodiments, at least 75) percent as compared to the same article if the thickness of the first layer was 1.25 micrometer.

Optionally, articles described herein further comprise a functional layer (i.e., at least one of a transparent conductive layer or a gas barrier layer) disposed between the first major surface of the substrate and the first layer. Optionally, articles described herein further comprise a functional layer (i.e., at least one of a transparent conductive layer or a gas barrier layer) disposed on the first random, nanostructured surface.

Optionally, articles described herein further comprise a second layer on the second major surface of the substrate, wherein the second layer has a random, nanostructured surface. Optionally, articles described herein further comprise a functional layer (i.e., at least one of a transparent conductive layer or a gas barrier layer) disposed between the second major surface of the substrate and the second layer. Optionally, articles described herein further comprise a functional layer (i.e., at least one of a transparent conductive layer or a gas barrier layer) disposed on the second random, nanostructured surface.

The random nanostructured articles described herein can be used for creating high performance, low fringing, antireflective optical articles. When a functional layer (i.e., at least one of a transparent conductive layer or a gas barrier layer) is disposed on the random nanostructured surface, the nanostructured articles can also be used to minimize interference fringing and the interfacial reflection from the substrate through the nanostructured surface layer into the functional layer, or vice versa, to greatly enhance the optical performance.

Embodiments of articles described herein are useful for numerous applications including display applications (e.g., liquid crystal displays (LCD), light emitting diode (LED) displays, or plasma displays); light extraction; electromagnetic interference (EMI) shielding, ophthalmic lenses; face shielding lenses or films; window films; antireflection for construction applications; and construction applications or traffic signs. Nanostructured articles described herein are also useful for solar applications (e.g., solar films). They can be used, for example, as the front surface of solar thermal hot liquid/air heat panels or any solar energy absorbing device; for solar thermal absorbing surfaces having micro- or macro-columns with additional nano-scale surface structure; for the front surface of flexible solar photovoltaic cells made with amorphous silica photovoltaic cells or CIGS photovoltaic cells; and for the front surface of a film applied on top of flexible photovoltaic cells.

DETAILED DESCRIPTION

Figure 1:
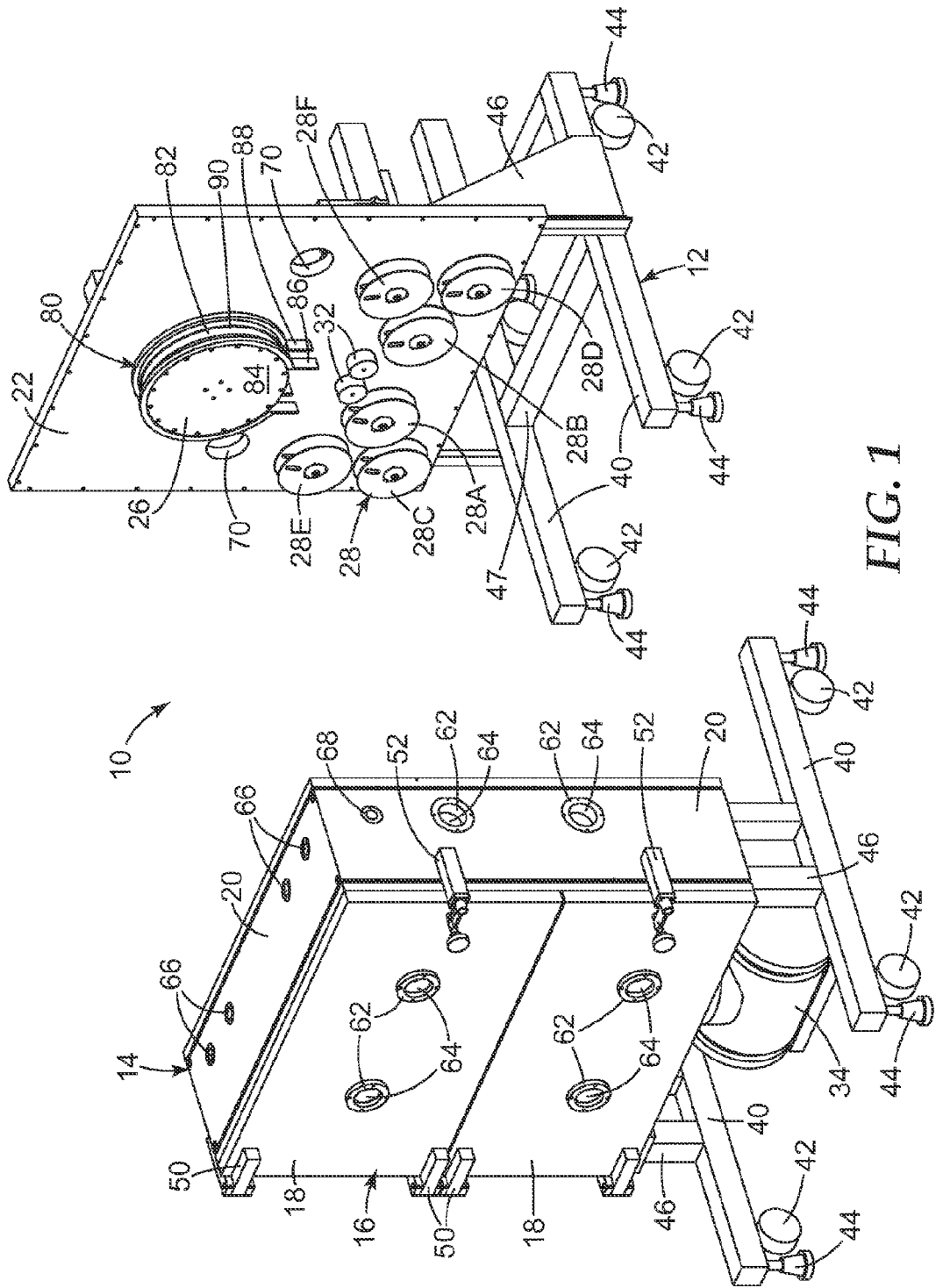
FIG. 1 is a first fragmentary perspective view of a coating apparatus useful in the present disclosure.

Exemplary substrates include polymeric substrates, glass substrates or windows, and functional devices (e.g., organic light emitting diodes (OLEDs), displays, and photovoltaic devices). Typically, the substrates have thicknesses in a range from about 12.7 micrometers (0.0005 inch) to about 762 micrometers (0.03 inch), although other thicknesses may also be useful.

Exemplary polymeric materials for the substrates include polyethylene terephthalate (PET), polystyrene, acrylonitrile butadiene styrene, polyvinyl chloride, polyvinylidene chloride, polycarbonate, polyacrylates, thermoplastic polyurethanes, polyvinyl acetate, polyamide, polyimide, polypropylene, polyester, polyethylene, poly(methyl methacrylate), polyethylene naphthalate, styrene acrylonitrile, silicone-polyoxamide polymers, fluoropolymers, triacetate cellulose, cyclic olefin copolymers, and thermoplastic elastomers. Semicrystalline polymers (e.g., polyethylene terephthalate (PET)) may be particularly desirable for the applications requiring good mechanical strength and dimensional stability. For other optical film applications, low birefringent polymeric substrates, such as triacetate cellulose, poly(methyl methacrylate), polycarbonate, and cyclic olefin copolymers, may be particularly desirable to minimize or avoid orientation induced polarization or dichroism interference with other optical components, such as polarizer, electromagnetic interference, or conductive touch functional layer in the optical display devices.

The polymeric substrates can be formed, for example, by melt extrusion casting, melt extrusion calendaring, melt extrusion with biaxial stretch, blown film process, and solvent casting optionally with biaxial stretch. In some embodiments, the substrates are highly transparent (e.g., at least 90% transmittance in the visible spectrum) with low haze (e.g., less than 1%) and low birefringence (e.g., less than 50 nanometers optical retardance). In some embodiments, the substrates have a microstructured surface or fillers to provide hazy or diffusive appearance.

Optionally, the substrate is a polarizer (e.g., a reflective polarizer or an absorptive polarizer). A variety of polarizer films may be used as the substrate, including multilayer optical films composed, for example, of some combination of all birefringent optical layers, some birefringent optical layers, or all isotropic optical layers. The multilayer optical films can have ten or less layers, hundreds, or even thousands of layers. Exemplary multilayer polarizer films include those used in a wide variety of applications such as liquid crystal display devices to enhance brightness and/or reduce glare at the display panel. The polarizer film may also be the type used in sunglasses to reduce light intensity and glare. The polarizer film may comprise a polarizer film, a reflective polarizer film, an absorptive polarizer film, a diffuser film, a brightness enhancing film, a turning film, a minor film, or a combination thereof. Exemplary reflective polarizer films include those reported in U.S. Pat. No. 5,825,543 (Ouderkirk et al.) U.S. Pat. No. 5,867,316 (Carlson et al.), U.S. Pat. No. 5,882,774 (Jonza et al.), U.S. Pat. No. 6,352,761 B1 (Hebrink et al.), U.S. Pat. No. 6,368,699 B1 (Gilbert et al.), and U.S. Pat. No. 6,927,900 B2 (Liu et al.), U.S. Pat. Appl. Pub. Nos. 2006/0084780 A1 (Hebrink et al.), and 2001/0013668 A1 (Neavin et al.), and PCT Pub. Nos. WO95/17303 (Ouderkirk et al.), WO95/17691 (Ouderkirk et al), WO95/17692 (Ouderkirk et al.), WO95/17699 (Ouderkirk et al.), WO96/19347 (Jonza et al.), WO97/01440 (Gilbert et al.), WO99/36248 (Neavin et al.), and WO99/36262 (Hebrink et al.), the disclosures of which are incorporated herein by reference. Exemplary reflective polarizer films also include commercially available from 3M Company, St. Paul, Minn., under the trade designations "VIKUITI DUAL BRIGHTNESS ENHANCED FILM (DBEF)", "VIKUITI BRIGHTNESS ENHANCED FILM (BEF)", "VIKUITI DIFFUSE REFLECTIVE POLARIZER FILM (DRPF)", "VIKUITI ENHANCED SPECULAR REFLECTOR (ESR)", and "ADVANCED POLARIZER FILM (APF)". Exemplary absorptive polarizer films are commercially available, for example, from Sanritz Corp., Tokyo, Japan, under the trade designation of "LLC2-5518SF".

The optical film may have at least one non-optical layer (i.e., a layer(s) that does not significantly participate in the determination of the optical properties of the optical film). The non-optical layers may be used, for example, to impart or improve mechanical, chemical, or optical, properties; tear or puncture resistance; weatherability; or solvent resistance.

Exemplary glass substrates include sheet glass (e.g., soda-lime glass) such as that made, for example, by floating molten glass on a bed of molten metal. In some embodiments (e.g., for architectural and automotive applications), it may be desirable to include a low-emissivity (low-E) coating on a surface of the glass to improve the energy efficiency of the glass. Other coatings may also be desirable in some embodiments to enhance the electro-optical, catalytic, or conducting properties of glass.

Typically, nanostructured articles described herein comprise a matrix (i.e., the continuous phase) and a nano-scale dispersed phase in the matrix. For the nano-scale dispersed phase, the size refers to less than about 100 nm for the smallest dimension of the nano-scale dispersed phase. The matrix can comprise, for example, polymeric material, liquid resins, inorganic material, or alloys or solid solutions (including miscible polymers). The matrix may comprise, for example, cross-linked material (e.g., cross-linked material was made by cross-linking at least one of cross-linkable materials multi(meth)acrylate, polyester, epoxy, fluoropolymer, urethane, or siloxane (which includes blends or copolymers thereof)) or thermoplastic material (e.g., at least one of polycarbonate, poly(meth)acrylate, polyester, nylon, siloxane, fluoropolymer, urethane, cyclic olefin copolymer, triacetate cellulose, or diacrylate cellulose (which includes blends or copolymers thereof)). Other matrix materials may include at least one of silicon oxide or tungsten carbide.

Useful polymeric materials include thermoplastics and thermosetting resins. Suitable thermoplastics include polyethylene terephthalate (PET), polystyrene, acrylonitrile butadiene styrene, polyvinyl chloride, polyvinylidene chloride, polycarbonate, polyacrylates, thermoplastic polyurethanes, polyvinyl acetate, polyamide, polyimide, polypropylene, polyester, polyethylene, poly(methyl methacrylate), poly(ethylene naphthalate), styrene acrylonitrile, silicone-polyoxamide polymers, triacetate cellulose, fluoropolymers, cyclic olefin copolymers, and thermoplastic elastomers.

Suitable thermosetting resins include allyl resin (including (meth)acrylates, polyester acrylates, urethane acrylates, epoxy acrylates and polyether acrylates), epoxies, thermosetting polyurethanes, and silicones or polysiloxanes. These resins can be formed from the reaction product of polymerizable compositions comprising the corresponding monomers or oligomers.

In one embodiment, the polymerizable compositions include at least one monomeric or oligomeric(meth)acrylate, preferably a urethane(meth)acrylate. Typically, the monomeric or oligomeric(meth)acrylate is multi(meth)acrylate. The term "(meth)acrylate" is used to designate esters of acrylic and methacrylic acids, and "multi(meth)acrylate" designates a molecule containing more than one (meth)acrylate group, as opposed to "poly(meth)acrylate" which commonly designates (meth)acrylate polymers. Most often, the multi(meth)acrylate is a di(meth)acrylate, but it is also contemplated, for example, to employ tri(meth)acrylates and tetra(meth)acrylates.

Suitable monomeric or oligomeric(meth)acrylates include alkyl(meth)acrylates, such as methyl(meth)acrylate, ethyl (meth)acrylate, 1-propyl(meth)acrylate and t-butyl(meth) acrylate. The acrylates may include (fluoro)alkylester monomers of (meth)acrylic acid, the monomers being partially or fully fluorinated (e.g., trifluoroethyl(meth)acrylate).

Examples of commercially available multi(meth)acrylate resins include those available, for example, from Mitsubishi Rayon Co., Ltd., Tokyo, Japan, under the trade designation "DIABEAM"; from Nagase & Company, Ltd., New York, N.Y., under the trade designation "DINACOL"; from Shin-Nakamura Chemical Co., Ltd., Wakayama, Japan, under the trade designation "NK ESTER"; from Dainippon Ink & Chemicals, Inc, Tokyo, Japan, under the trade designation "UNIDIC; from Toagosei Co., Ltd., Tokyo, Japan, under the trade designation "ARONIX"; from NOF Corp., White Plains, N.Y., under the trade designation "BLENMER"; from Nippon Kayaku Co., Ltd., Tokyo, Japan, under the trade designation "KAYARAD"; and from Kyoeisha Chemical Co., Ltd., Osaka, Japan, under the trade designations "LIGHT ESTER" and "LIGHT ACRYLATE".

Oligomeric urethane multi(meth)acrylates are commercially available, for example, from Sartomer, Exton, Pa., under the trade designation "PHOTOMER 6000 Series" (e.g., "PHOTOMER 6010" and "PHOTOMER 6020") and "CN 900 Series" (e.g., "CN966B85", "CN964", and "CN972"). Oligomeric urethane(meth)acrylates are also available, for example, from Cytec Industries Inc., Woodland Park, N.J., under the trade designations "EBECRYL 8402", "EBECRYL 8807," and "EBECRYL 4827". Oligomeric urethane(meth)acrylates may also be prepared by the initial reaction of an alkylene or aromatic diisocyanate of the formula OCN—$R_3$—NCO with a polyol. Typically, the polyol is a diol of the formula HO—$R_4$—OH where $R_3$ is a C2-100 alkylene or an arylene group and $R_4$ is a C2-100 alkylene group. The intermediate product is then a urethane diol diisocyanate, which subsequently can undergo reaction with a hydroxyalkyl(meth)acrylate. Suitable diisocyanates include 2,2,4-trimethylhexylene diisocyanate and toluene diisocyanate. Alkylene diisocyanates are generally preferred. A particularly preferred compound of this type may be prepared from 2,2,4-trimethylhexylene diisocyanate, poly(caprolactone)diol and 2-hydroxyethyl methacrylate. In at least some cases, the urethane(meth)acrylate is preferably aliphatic.

The polymerizable compositions can be mixtures of various monomers or oligomers, having the same or differing reactive functional groups. Polymerizable compositions comprising at least two different functional groups may be used, including (meth)acrylate, epoxy and urethane. The differing functionality may be contained in different monomeric or oligomeric moieties or in the same monomeric or oligomeric moiety. For example, a resin composition may comprise an acrylic or urethane resin having an epoxy group or a hydroxyl group in the side chain, a compound having an amino group and, optionally, a silane compound having an epoxy group or amino group in the molecule.

The thermosetting resin compositions are polymerizable using conventional techniques such as thermal cure, photocure (cure by actinic radiation), or e-beam cure. In one embodiment, the resin is photopolymerized by exposing it to ultraviolet (UV) or visible light. Conventional curatives or catalysts may be used in the polymerizable compositions and are selected based on the functional group(s) in the composition. Multiple curatives or catalysts may be required if multiple cure functionality is being used. Combining one or more cure techniques, such as thermal cure, photocure, and e-beam cure, is within the scope of the present disclosure.

Furthermore, the polymerizable resins can be compositions comprising at least one other monomer or oligomer (i.e., other than those described above, namely the monomeric or oligomeric(meth)acrylate and the oligomeric urethane(meth)acrylate). This other monomer may reduce viscosity and/or improve thermomechanical properties and/or increase refractive index. Monomers having these properties include acrylic monomers (i.e., acrylate and methacrylate esters, acrylamides, and methacrylamides), styrene monomers, and ethylenically unsaturated nitrogen heterocycles.

(Meth)acrylate esters having other functionality are also useful. Exemplary compounds of this type include 2-(N-butylcarbamyl)ethyl(meth)acrylates, 2,4-dichlorophenyl acrylate, 2,4,6-tribromophenyl acrylate, tribromophenoxylethyl acrylate, t-butylphenyl acrylate, phenyl acrylate, phenyl thioacrylate, phenylthioethyl acrylate, alkoxylated phenyl acrylate, isobornyl acrylate, and phenoxyethyl acrylate. The reaction product of tetrabromobisphenol A diepoxide and (meth)acrylic acid is also useful.

Other exemplary monomers include a polyol multi(meth)acrylate. Such compounds are typically prepared from aliphatic diols, triols, and/or tetraols containing 2-10 carbon atoms. Examples of suitable poly(meth)acrylates are ethylene glycol diacrylate, 1,6-hexanediol diacrylate, 2-ethyl-2-hydroxymethyl-1,3-propanediol triacylate(trimethylolpropane triacrylate), di(trimethylolpropane)tetraacrylate, pentaerythritol tetraacrylate, the corresponding methacrylates and the (meth)acrylates of alkoxylated (usually ethoxylated) derivatives of said polyols. Monomers having at least two ethylenically unsaturated groups can serve as a crosslinker.

Styrenic compounds suitable for use as the other monomer include styrene, dichlorostyrene, 2,4,6-trichlorostyrene, 2,4,6-tribromostyrene, 4-methylstyrene, and 4-phenoxystyrene. Ethylenically unsaturated nitrogen heterocycles (e.g., N-vinylpyrrolidone and vinylpyridine) are also useful.

Constituent proportions in the radiation curable materials can vary. In general, the organic component can comprise about 30-100% monomeric or oligomeric(meth)acrylate or oligomeric urethane multi(meth)acrylate, with any balance being the other monomer or oligomer.

Surface leveling agents may be added to the matrix. The leveling agent is preferably used for smoothing the matrix resin. Examples include silicone-leveling agents, acrylic-leveling agents and fluorine-containing-leveling agents. In one embodiment, the silicone-leveling agent includes a polydimethyl siloxane backbone to which polyoxyalkylene groups are added.

Useful inorganic materials for the matrix include glasses, metals, metal oxides, and ceramics. Preferred inorganic materials include silicon oxide, zirconia, vanadium pentoxide, and tungsten carbide.

The nano-scale dispersed phase is a discontinuous phase randomly dispersed within the matrix. The nano-scale dispersed phase can comprise nanoparticles (e.g., nanospheres, and nanocubes), nanotubes, nanofibers, caged molecules, hyperbranched molecules, micelles, or reverse micelles. Preferably, the dispersed phase comprises nanoparticles or caged molecules; more preferably, the dispersed phase comprises nanoparticles. The nano-scale dispersed phase can be associated or unassociated or both. The nano-scale dispersed phase can be well dispersed. Well dispersed means little agglomeration.

Nanoparticles have a mean diameter in the range from about 1 nm to about 100 nm. In some embodiments, the nanoparticles have average particle size of less than 100 nm (in some embodiments, in a range from 5 nm to 40 nm). The term "nanoparticle" can be further defined herein to mean colloidal (primary particles or associated particles) with a diameter less than about 100 nm. The term "associated particles" as used herein refers to a grouping of two or more primary particles that are aggregated and/or agglomerated. The term "aggregated" as used herein is descriptive of a strong association between primary particles which may be chemically bound to one another. The breakdown of aggregates into smaller particles is difficult to achieve. The term "agglomerated" as used herein is descriptive of a weak association of primary particles which may be held together by charge or polarity and can be broken down into smaller entities. The term "primary particle size" is defined herein as the size of a non-associated single particle. The dimension or size of the nano-scale dispersed phase can be determined by electron microscopy (e.g., transmission electron microscopy (TEM)).

Nanoparticles for the dispersed phase can comprise carbon, metals, metal oxides (e.g., $SiO_2$, $ZrO_2$, $TiO_2$, $ZnO$, magnesium silicate, indium tin oxide, and antimony tin oxide), carbides, nitrides, borides, halides, fluorocarbon solids (e.g., poly(tetrafluoroethylene)), carbonates (e.g., calcium carbonate), and mixtures thereof. In some embodiments, the nano-scale dispersed phase comprises at least one of $SiO_2$ nanoparticles, $ZrO_2$ nanoparticles, $TiO_2$ nanoparticles, ZnO nanoparticles, $Al_2O_3$ nanoparticles, calcium carbonate nanoparticles, magnesium silicate nanoparticles, indium tin oxide nanoparticles, antimony tin oxide nanoparticles, poly(tetrafluoroethylene) nanoparticles, or carbon nanoparticles. Metal oxide nanoparticles can be fully condensed. Metal oxide nanoparticles can be crystalline.

Typically, the nanoparticles/nanodispersed phase is present in the matrix in an amount in a range from about 1 wt. % to about 60 wt. % (in some embodiments, about 10 wt. % to about 40 wt. %, or even about 20 wt. % to about 40 wt. %). Typically, on a volume basis, the nanoparticles/nanodispersed phase is present in the matrix in an amount in a range from about 0.5 percent by volume to about 40 percent by volume (in some embodiments, about 5 percent by volume to about 25 percent by volume, about 1 percent by volume to about 20 percent by volume, or even about 2 percent by volume to about 10 percent by volume) although amounts outside these ranges may also be useful.

Exemplary silicas are commercially available, for example, from Nalco Chemical Co., Naperville, Ill., under the trade designation "NALCO COLLOIDAL SILICA," such as products 1040, 1042, 1050, 1060, 2327, and 2329. Exemplary fumed silicas include those commercially available, for example, from Evonik Degusa Co., Parsippany, N.J., under the trade designation, "AEROSIL series OX-50", as well as product numbers -130, -150, and -200; and from Cabot Corp., Tuscola, Ill., under the designations "CAB-O-SPERSE 2095", "CAB-O-SPERSE A105", and "CAB-O-SIL M5". Other colloidal silica can be also obtained from Nissan Chemicals under the designations "IPA-ST", "IPA-ST-L", and "IPA-ST-ML". Exemplary zirconias are available, for example, from Nalco Chemical Co. under the trade designation "NALCO OOSSOO8".

Optionally, the nanoparticles are surface modified nanoparticles. Preferably, the surface-treatment stabilizes the nanoparticles so that the particles will be well dispersed in the polymerizable resin and result in a substantially homogeneous composition. Furthermore, the nanoparticles can be modified over at least a portion of its surface with a surface treatment agent so that the stabilized particles can copolymerize or react with the polymerizable resin during curing.

The nanoparticles are preferably treated with a surface treatment agent. In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes, and titanates. The preferred type of treatment agent is determined, in part, by the chemical nature of the metal oxide surface. Silanes are preferred for silica and other for siliceous fillers. Silanes and carboxylic acids are preferred for metal oxides, such as zirconia. The surface modification can be done either subsequent to mixing with the monomers or after mixing. It is preferred in the case of silanes to react the silanes with the particles or nanoparticle surface before incorporation into the resins. The required amount of surface modifier is dependent on several factors such as particle size, particle type, molecular weight of the modifier, and modifier type.

Representative embodiments of surface treatment agents include compounds such as isooctyl tri-methoxy-silane, N-(3-triethoxysilylpropyl)methoxyethoxy-ethoxyethyl carbamate (PEG3TES), N-(3-triethoxysilylpropyl)methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, vinyldimethylethoxysilane, pheyltrimethaoxysilane, n-octyltrimethoxysilane, dodecyltrimethoxysilane, octadecyltrimethoxysilane, propyltrimethoxysilane, hexyltrimethoxysilane, vinylmethyldiactoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris (2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-(2-(2-methoxyethoxy) ethoxy)acetic acid (MEEAA), beta-carboxyethylacrylate, 2-(2-methoxyethoxy)acetic acid, methoxyphenyl acetic acid, and mixtures thereof. A specific exemplary silane surface modifier is commercially available, for example, from OSI Specialties, Crompton South Charleston, W. Va., under the trade designation "SILQUEST A1230".

The surface modification of the particles in the colloidal dispersion can be accomplished in a variety of ways. The process involves the mixture of an inorganic dispersion with surface modifying agents. Optionally, a co-solvent can be added at this point, such as 1-methoxy-2-propanol, ethanol, isopropanol, ethylene glycol, N,N-dimethylacetamide, and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface modified sol. In another method, where metal oxides are surface modified, the surface treatment of the metal oxide can preferably involve the adsorption of acidic molecules to the particle surface. The surface modification of the heavy metal oxide preferably takes place at room temperature.

The surface modification of $ZrO_2$ with silanes can be accomplished under acidic conditions or basic conditions. In one example, the silanes are heated under acid conditions for a suitable period of time. At which time the dispersion is combined with aqueous ammonia (or other base). This method allows removal of the acid counter ion from the $ZrO_2$ surface as well as reaction with the silane. In another method, the particles are precipitated from the dispersion and separated from the liquid phase.

A combination of surface modifying agents can be useful, for example, wherein at least one of the agents has a functional group co-polymerizable with a hardenable resin. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom, such as oxygen, sulfur, or nitrogen, and preferably a 3-membered ring containing oxygen (e.g., an epoxide).

Useful caged molecules for the nanodispersed phase include polyhedral oligomeric silsesquioxane molecules, which are cage-like hybrid molecules of silicone and oxygen. Polyhedral oligomeric silsesquioxane (POSS) molecules are derived from a continually evolving class of compounds closely related to silicones through both composition and a shared system of nomenclature. POSS molecules have two unique features (1) the chemical composition is a hybrid, intermediate ($RSiO_{1.5}$) between that of silica ($SiO_2$) and silicone ($R_2SiO$), and (2) the molecules are physically large with respect to polymer dimensions and nearly equivalent in size to most polymer segments and coils. Consequently, POSS molecules can be thought of as the smallest particles (about 1-1.5 nm) of silica possible. However, unlike silica or modified clays, each POSS molecule contains covalently bonded reactive functionalities suitable for polymerization or grafting POSS monomers to polymer chains. In addition, POSS acrylate and methacrylate monomers are suitable for ultraviolet (UV) curing. High functionality POSS acrylates and methacrylates (available, for example, under the trade designations "MA0735" and "MA0736" from Hybrid Plastics, Inc., Hattiesburg, Miss.) are miscible with most of the UV-curable acrylic and urethane acrylic monomers or oligomers to form mechanically durable hardcoat in which POSS molecules form nanophases uniformly dispersed in the organic coating matrix.

Carbon can also be used in the nanodispersed phase in the form of graphite, carbon nanotubes, bulky balls, or carbon black such as reported, for example, in U.S. Pat. No. 7,368,161 (McGurran et al.).

Additional materials that can be used in the nanodispersed phase include those available, for example, from Ciba Corporation, Tarrytown, N.Y., under the trade designation "IRGASTAT P18"; and from Ampacet Corporation, Tarrytown, N.Y., under the trade designation "AMPACET LR-92967".

The random nanostructured surface(s) of articles described herein can be a random nanoporous surface or a random nanostructured anisotropic surface comprising nanofeatures having, for example, a height to width ratio of about 2:1 or greater (in some embodiments, at least 5:1, 10:1, 25:1, 50:1 75:1, 100:1, or even at least 200:1). The random nanostructured surface can comprise nanofeatures, such as nano-pillars or nano-columns, or continuous nano-walls comprising nano-pillars or nano-columns. In some embodiments, the nanofeatures have steep side walls that are roughly perpendicular to the substrate.

In some embodiments, the majority of the nanofeatures are capped with dispersed phase material. The concentration of the dispersed phase at the surface (versus in the interior of the matrix) can range, for example, from about 5 wt. % to about 90 wt. % (in some embodiments, in a range from about 10 wt. % to about 75 wt. %). In some embodiments, the concentration of the dispersed phase is higher at the surface of the matrix than within the matrix.

Random nanostructured surfaces can be made, for example, by providing a matrix comprising a nanodispersed phase, and anisotropically etching the matrix using plasma to form a random nanostructured anisotropic surface. Another method comprises providing a matrix comprising a nanodispersed phase, and etching at least a portion of the nanodispersed phase using plasma to form a random nanostructured surface. As used herein, "plasma" means a partially ionized gaseous or fluid state of matter containing electrons, ions, neutral molecules, and free radicals. These methods are typically and desirably carried out at moderate vacuum conditions (e.g., in a range from about 5 mTorr to about 10 mTorr). In some embodiments, they are carried out as a roll-to-roll (i.e., continuous) process using cylindrical reactive ion etching (cylindrical RIE). Articles having the nanostructured surface typically desirably exhibit a significant reduction in reflectance compared to an unstructured article comprising the same matrix material and nanodispersed phase. Some embodiments of articles having the nanostructured surface also exhibit additional desirable properties, such as light absorbing properties, antifogging, improved adhesion, durability, easy cleaning, antimicrobial activity, hydrophilicity, or hydrophobicity.

Nanostructured articles described herein can exhibit at least one desirable property, such as antireflective properties, light absorbing properties, antifogging properties, improved adhesion, and durability.

For example, in some embodiments, the surface reflectivity of the nanostructured anisotropic surface is about 50% or less than the surface reflectivity of an untreated surface. As used herein with respect to comparison of surface properties, the term "untreated surface" means the surface of an article comprising the same matrix material and the same nanodispersed phase (as the nanostructured surface to which it is being compared), but without a nanostructured anisotropic surface.

Some embodiments further comprise a layer or coating comprising, for example, ink, encapsulant, adhesive, or metal attached to the nanostructured anisotropic surface. The layer or coating can have improved adhesion to the nanostructured anisotropic surface than to an untreated surface. Ink or encapsulant coatings can be applied on the substrates, for example, by solvent, electrostatic deposition, and powder printing processes and cured by UV radiation or thermal treatment. Pressure sensitive adhesives or structural adhesives can be applied on the substrates, for example, by solvent and hot melt coating processes. For metallization of plastics, the surface is typically pre-treated by oxidation and coated with electroless copper or nickel before further plating with silver, aluminum, gold, or platinum. For vacuum metallization, the process typically involves heating (e.g., resistance, electron beam, or plasma heating) the coating metal to its boiling point in a vacuum chamber, then letting condensation deposit the metal on the substrate's surface.

The first layer and optional second layer independently have an average thickness up to 0.5 micrometer (in some embodiments, up to 0.4 micrometer, 0.3 micrometer, 0.25 micrometer, 0.2 micrometer, 0.15 micrometer, 0.1 micrometer, or even up to 0.075 micrometer). Optionally, the first layer and/or the second layer comprise a matrix (e.g., a polymeric matrix) and a nanoscale dispersed phase. Coating comprising matrix and nanoscale dispersed phase can coated on the substrates and cured using methods known in the art (e.g., casting cure by casting drum, die coating, flow coating, or dip coating). The coating can be prepared in any desired thickness up to 0.5 micrometer (in some embodiments, up to 0.4 micrometer, 0.3 micrometer, 0.25 micrometer, 0.2 micrometer, 0.15 micrometer, 0.1 micrometer, or even up to 0.075 micrometer). In addition, the coating can be cured by UV, electron beam, or heat. Etching at least a portion of the matrix and nanodispersed phase using plasma can form the random nanostructured or nanoporous surface. The methods can be carried out at moderate vacuum conditions (e.g., in a range from about 5 mTorr to about 10 mTorr).

A typical reactive ion etching (RIE) system consists of a vacuum chamber with two parallel electrodes, the "powered electrode" (or "sample carrier electrode") and the counter-electrode, which creates an electric field that accelerates ions toward. The powered electrode is situated in the bottom portion of the chamber and is electrically isolated from the rest of the chamber. The article or sample to be nanostructured is placed on the powered electrode. Reactive gas species can be added to the chamber, for example, through small inlets in the top of the chamber and can exit to the vacuum pump system at the bottom of the chamber. Plasma is formed in the system by applying a RF electromagnetic field to the powered electrode. The field is typically produced using a 13.56 MHz oscillator, although other RF sources and frequency ranges may be used. The gas molecules are broken and can become ionized in the plasma and accelerated toward the powered electrode to etch the sample. The large voltage difference causes the ions to be directed toward the powered electrode where they collide with the sample to be etched. Due to the (mostly) vertical delivery of the ions, the etch profile of the sample is substantially anisotropic. Preferably, the powered electrode is smaller than the counter-electrode creating a large voltage potential across the ion sheath adjacent the powered electrode. Preferably, the etching is to a depth greater than about 100 nm.

The process pressure is typically maintained at below about 20 mTorr (in some embodiments, below about 10 mTorr), but greater than about 1 mTorr. This pressure range is very conducive for generation of the anisotropic nanostructure in a cost effective manner. When the pressure is above about 20 mTorr, the etching process becomes more isotropic because of the collisional quenching of the ion energy. Similarly, when the pressure goes below about 1 mTorr, the etching rate becomes very low because of the decrease in number density of the reactive species. Also, the gas pumping requirements become very high.

The power density of the RF power of the etching process is preferably in the range of about 0.1 watts/cm$^3$ to about 1.0 watts/cm$^3$ (in some embodiments, about 0.2 watts/cm$^3$ to about 0.3 watts/cm$^3$).

The type and amount of gas utilized will depend upon the matrix material to be etched. The reactive gas species need to selectively etch the matrix material rather than the dispersed phase. Additional gases may be used for enhancing the etching rate of hydrocarbons or for the etching of non-hydrocarbon materials. For example, fluorine containing gases (e.g., perfluoromethane, perfluoroethane, perfluoropropane, sulfurhexafluoride, and nitrogen trifluoride) can be added to oxygen or introduced by themselves to etch materials such as $SiO_2$, tungsten carbide, silicon nitride, and amorphous silicon. Chlorine-containing gases can likewise be added for the etching of materials such as aluminum, sulfur, boron carbide, and semiconductors from the Group II-VI (including cadmium, magnesium, zinc, sulfur, selenium, tellurium, and combinations thereof and from the Group III-V (including aluminum, gallium, indium, arsenic, phosphorous, nitrogen, antimony, or combinations thereof. Hydrocarbon gases (e.g., methane) can be used for the etching of materials (e.g., gallium arsenide, gallium, and indium). Inert gases, particularly heavy gases such as argon can be added to enhance the anisotropic etching process.

Methods for making nanostructured surfaces described herein can also be carried out using a continuous roll-to-roll process. For example, the method can be carried out using "cylindrical" RIE. Cylindrical RIE utilizes a rotating cylindrical electrode to provide anisotropically etched nanostructures on the surface of the article.

In general, cylindrical RIE for making the nanostructured articles described herein can be described as follows. A rotatable cylindrical electrode ("drum electrode") powered by radio-frequency (RF) and a grounded counter-electrode are provided inside a vacuum vessel. The counter-electrode can comprise the vacuum vessel itself. Gas comprising an etchant is fed into the vacuum vessel, and plasma is ignited and sustained between the drum electrode and the grounded counter-electrode. The conditions are selected so that sufficient ion bombardment is directed perpendicular to the circumference of the drum. A continuous article comprising the matrix containing the nanodispersed phase can then be wrapped around the circumference of the drum and the matrix can be etched in the direction normal to the plane of the article. The matrix can be in the form of a coating on an article (e.g., on a film or web, or the matrix can be the article itself). The exposure time of the article can be controlled to obtain a predetermined etch depth of the resulting nanostructure. The process can be carried out at an operating pressure of about 10 mTorr.

Figure 2:
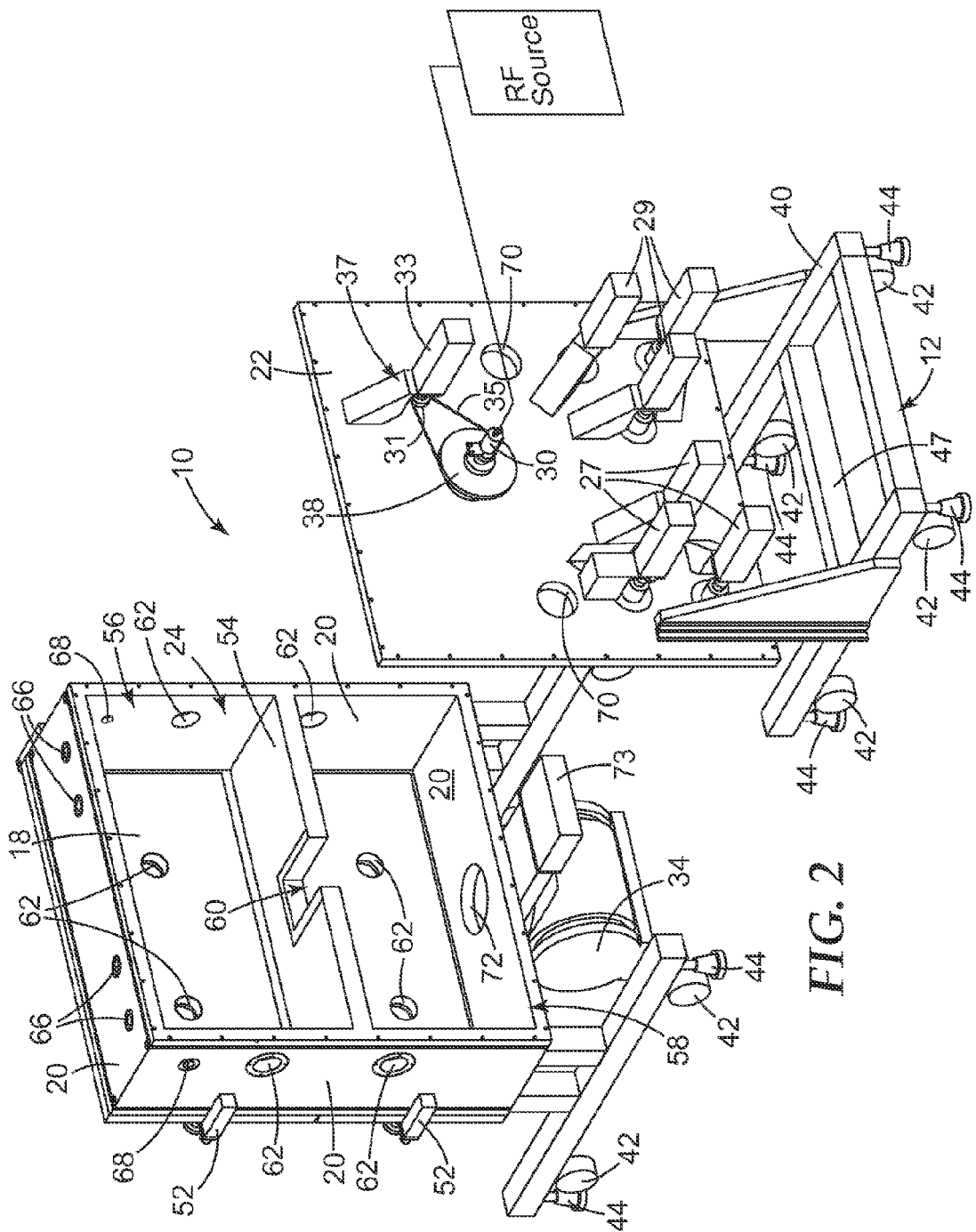
FIG. 2 is a second fragmentary perspective view of the apparatus of FIG. 1 taken from a different vantage point.

FIGS. 1 and 2 illustrate a cylindrical RIE apparatus that is useful for exemplary methods of making nanostructured articles described herein. A common element for plasma creation and ion acceleration is generally indicated as 10. This RIE apparatus 10 includes support structure 12, housing 14 including front panel 16 of one or more doors 18, side walls 20 and back plate 22 defining inner chamber 24 therein divided into one or more compartments, drum 26 rotatably affixed within the chamber, plurality of spool mechanisms rotatably affixed within the chamber and referred to generally as 28, drive assembly 37 for rotatably driving drum 26, idler rollers 32 rotatably affixed within the chamber, and vacuum pump 34 fluidly connected to the chamber.

Support structure 12 is any means known in the art for supporting housing 14 in a desired configuration, a vertically upright manner in the present case. As shown in FIGS. 1 and 2, housing 14 can be a two-part housing as described below in more detail. In this embodiment, support structure 12 includes cross supports 40 attached to each side of the two-part housing for supporting apparatus 10. Specifically, cross supports 40 include both wheels 42 and adjustable feet 44 for moving and supporting, respectively, apparatus 10. In the embodiment shown in FIGS. 1 and 2, cross supports 40 are attached to each side of housing 14 through attachment supports 46. Specifically, cross supports 40 are connected to one of side walls 20, namely the bottom side wall, via attachment supports 46, while cross supports 40 on the other side of housing 14 are connected to back plate 22 by attachment supports 46. An additional crossbar 47 is supplied between cross supports 40 on the right-hand side of apparatus 10 as shown in FIG. 1. This can provide additional structural reinforcement.

Housing 14 can be any means of providing a controlled environment that is capable of evacuation, containment of gas introduced after evacuation, plasma creation from the gas, ion acceleration, and etching. In the embodiment shown in FIGS. 1 and 2, housing 14 has outer walls that include front panel 16, four side walls 20, and back plate 22. The outer walls define a box with a hollow interior, denoted as chamber 24. Side walls 20 and back plate 22 are fastened together, in any manner known in the art, to rigidly secure side walls 20 and back plate 22 to one another in a manner sufficient to allow for evacuation of chamber 24, containment of a fluid for plasma creation, plasma creation, ion acceleration, and etching. Front panel 16 is not fixedly secured so as to provide access to chamber 24 to load and unload substrate materials and to perform maintenance. Front panel 16 is divided into two plates connected via hinges 50 (or an equivalent connection means) to one of side walls 20 to define a pair of doors 18. These doors seal to the edge of side walls 20, preferably through the use of a vacuum seal (e.g., an O-ring). Locking mechanisms 52 selectively secure doors 18 to side walls 20 and can be any mechanism capable of securing doors 18 to side walls 20 in a manner allowing for evacuation of chamber 24, storage of a fluid for plasma creation, plasma creation, ion acceleration, and etching.

In one embodiment, chamber 24 is divided by divider wall 54 into two compartments 56 and 58. Passage or hole 60 in wall 54 provides for passage of fluids or substrate between compartments. Alternatively, the chamber can be only one compartment or three or more compartments. Preferably, the chamber is only one compartment.

Housing 14 includes plurality of view ports 62 with high pressure, clear polymeric plates 64 sealably covering ports 62 to allow for viewing of the etching process occurring therein. Housing 14 also includes plurality of sensor ports 66 in which various sensors (e.g., temperature, pressure, etc.) can be secured. Housing 14 further includes inlet ports 68 providing for conduit connection through which fluid can be introduced into chamber 24 as needed. Housing 14 also includes pump ports 70 and 72 that allow gases and liquids to be pumped or otherwise evacuated from chamber 24.

Pump 34 is shown suspended from one of side walls 20, preferably the bottom (as shown in FIG. 2). Pump 34 can be, for example, a turbo-molecular pump fluidly connected to the controlled environment within housing 14. Other pumps, such as diffusion pumps or cryopumps, can be used to evacuate lower compartment 58 and to maintain operating pressure therein. The process pressure during the etching step is preferably chosen to be in a range from about 1 mTorr to about 20 mTorr to provide anisotropic etching. Sliding valve 73 is positioned along this fluid connection and can selectively intersect or block fluid communication between pump 34 and the interior of housing 14. Sliding valve 73 is movable over pump port 62 so that pump port 62 can be fully open, partially open, or closed with respect to fluid communication with pump 34.

Drum 26 preferably is cylindrical electrode 80 with annular surface 82 and two planar end surfaces 84. The electrode can be made of any electrically conductive material and preferably is a metal (e.g., aluminum, copper, steel, stainless steel, silver, chromium, or an alloy thereof). Preferably, the electrode is aluminum, because of the ease of fabrication, low sputter yield, and low costs.

Drum 26 is further constructed to include non-coated, conductive regions that allow an electric field to permeate outward as well as non-conductive, insulative regions for preventing electric field permeation and thus for limiting film coating to the non-insulated or conductive portions of the electrode. The electrically non-conductive material typically is an insulator, such as a polymer (e.g., polytetrafluoroethylene). Various embodiments that fulfill this electrically non-conductive purpose so as to provide only a small channel, typically the width of the transparent conductive oxide substrate to be coated, as a conductive area can be envisioned by one of ordinary skill in the art.

FIG. 1 shows an embodiment of drum 26 where annular surface 82 and end surfaces 84 of drum 26 are coated with an electrically non-conductive or insulative material, except for annular channel 90 in annular surface 82 which remains uncoated and thus electrically conductive. In addition, pair of dark space shields 86 and 88 cover the insulative material on annular surface 82, and in some embodiments cover end surfaces 84. The insulative material limits the surface area of the electrode along which plasma creation and negative biasing may occur. However, since the insulative materials sometimes can become fouled by the ion bombardment, dark space shields 86 and 88 can cover part or all of the insulated material. These dark space shields may be made from a metal (e.g., aluminum), but do not act as conductive agents because they are separated from the electrode by means of an insulating material (not shown). This allows confinement of the plasma to the electrode area.

Figure 3:
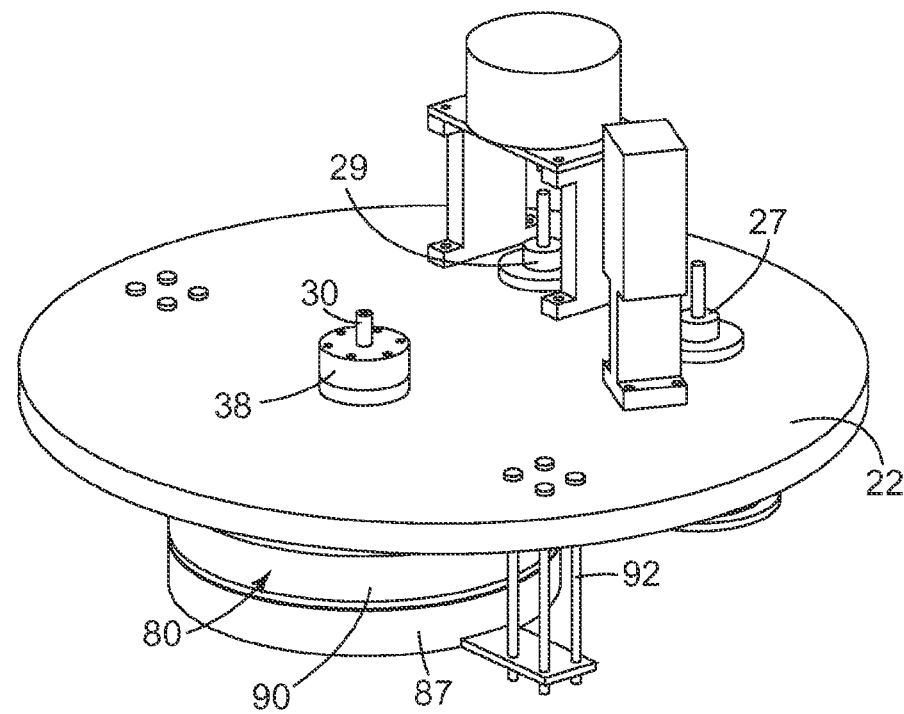
FIG. 3 is a fragmentary perspective view of another embodiment of the coating apparatus removed from its gas containing chamber.
Figure 4:
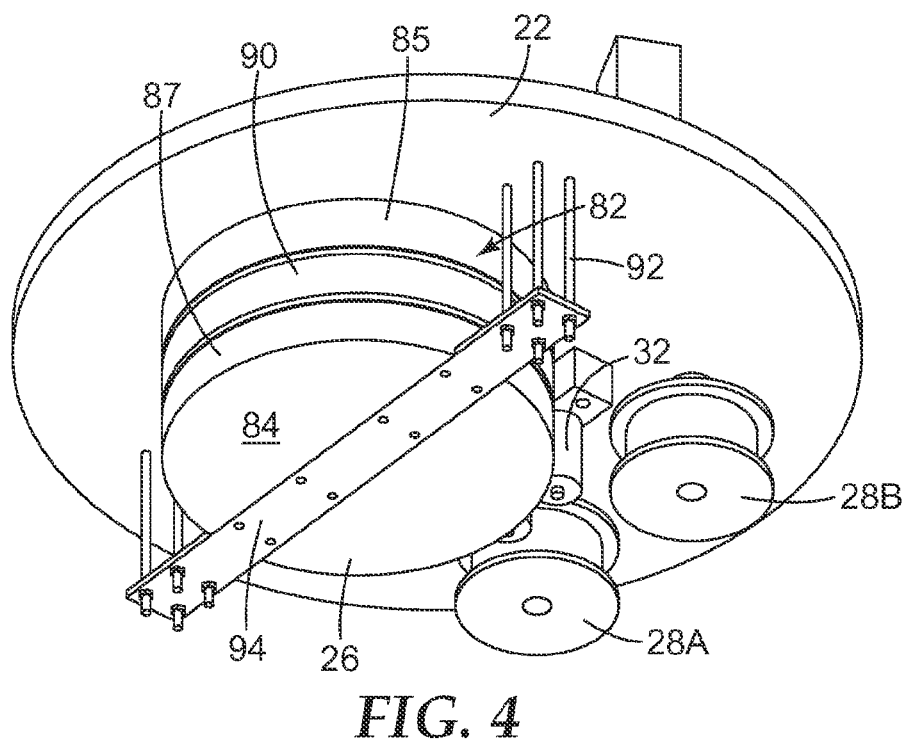
FIG. 4 is a second perspective view of the apparatus of FIG. 3 taken from a different vantage point.

Another embodiment of drum 26 is shown in FIGS. 3 and 4 where drum 26 includes pair of insulative rings 85 and 87 affixed to annular surface 82 of drum 26. In some embodiments, insulative ring 87 is a cap which acts to also cover end surface 84. Bolts 92 secure support means 94, embodied as a flat plate or strap, to back plate 22. Bolts 92 and support 94 can assist in supporting the various parts of drum 26. Pair of insulative rings 85 and 87, once affixed to annular surface 82, defines an exposed electrode portion embodied as channel 90.

Electrode 80 is covered in some manner by an insulative material in all areas except where the transparent conductive oxide substrate contacts the electrode (i.e., touching or within the plasma dark space limit of the electrode (e.g., about 3 mm)) This defines an exposed electrode portion that can be in intimate contact with the transparent conductive oxide substrate. The remainder of the electrode is covered by an insulative material. When the electrode is powered and the electrode becomes negatively biased with respect to the resultant plasma, this relatively thick insulative material prevents etching on the surfaces it covers. As a result, etching is limited to the uncovered area (i.e., that which is not covered with insulative material, channel 90), which preferably is covered by relatively thin transparent conductive oxide substrate.

Referring to FIGS. 1 and 2, drum 26 is rotatably affixed to back plate 22 through a ferrofluidic feedthrough and rotary union 38 (or an equivalent mechanism) affixed within a hole in back plate 22. The ferrofluidic feedthrough and rotary union provide separate fluid and electrical connection from a standard coolant fluid conduit and electrical wire to hollow coolant passages and the conductive electrode, respectively, of rotatable drum 26 during rotation while retaining a vacuum seal. The rotary union also supplies the necessary force to rotate the drum, which force is supplied from any drive means such as a brushless DC servo motor. However, connection of drum 26 to back plate 22 and the conduit and wire may be performed by any means capable of supplying such a connection and is not limited to a ferrofluidic feedthrough and a rotary union. One example of such a ferrofluidic feedthrough and rotary union is a two-inch (about 5 cm) inner diameter hollow shaft feedthrough made by Ferrofluidics Co., Nashua, N.H.

Drum 26 is rotatably driven by drive assembly 37, which can be any mechanical or electrical system capable of translating rotational motion to drum 26. In the embodiment shown in FIG. 2, drive assembly 37 includes motor 33 with a drive shaft terminating in drive pulley 31 that is mechanically connected to a driven pulley 39 rigidly connected to drum 26. Belt 35 (or equivalent structure) translates rotational motion from drive pulley 31 to driven pulley 39.

Plurality of spool mechanisms 28 are rotatably affixed to back plate 22. The plurality of spool mechanisms 28 includes a substrate spool mechanism with pair of substrate spools 28A and 28B, and, in some embodiments, also can include a spacing web spool mechanism with pair of spacing web spools 28C and 28D, and masking web spool mechanism with pair of masking web spools 28E and 28F, where each pair includes one delivery and one take-up spool. As is apparent from FIG. 2, at least each take-up spool 28B, 28D, and 28F includes a drive mechanism 27 mechanically connected thereto such as a standard motor as described below for supplying a rotational force that selectively rotates the spool as needed during etching. In addition, each delivery spool 28A, 28C, and 28E in select embodiments includes a tensioner for supplying tautness to the webs or a drive mechanism 29.

Each spool mechanism includes a delivery and a take-up spool which may be in the same or a different compartment from each other, which in turn may or may not be the same compartment the electrode is in. Each spool is of a standard construction with an axial rod and a rim radially extending from each end defining a groove in which an elongated member, in this case a substrate or web, is wrapped or wound. Each spool is securably affixed to a rotatable stem sealably extending through back plate 22. In the case of spools to be driven, the stem is mechanically connected to motor 27 (e.g., a brushless DC servo motor). In the case of non-driven spools, the spool is merely coupled in a rotatable manner through a drive mechanism 29 to back plate 22 and may include a tension mechanism to prevent slack.

RIE apparatus 10 also includes idler rollers 32 rotatably affixed within the chamber and pump 34 fluidly connected to the chamber. The idler rollers guide the substrate from substrate spool 28A to channel 90 on drum 26 and from channel 90 to take-up substrate spool 28B. In addition, where spacing webs and masking webs are used, idler rollers 32 guide these webs and the substrate from substrate spool 28A and masking web spool 28E to channel 90 and from channel 90 to take-up substrate spool 28B and take-up masking web spool 28F, respectively.

RIE apparatus 10 further includes a temperature control system for supplying temperature controlling fluid to electrode 80 via ferrofluidic feedthrough 38. The temperature control system may be provided on apparatus 10 or alternatively may be provided from a separate system and pumped to apparatus 10 via conduits so long as the temperature control fluid is in fluid connection with passages within electrode 80. The temperature control system may heat or cool electrode 80 as is needed to supply an electrode of the proper temperature for etching. In one embodiment, the temperature control system is a coolant system using a coolant (e.g., water, ethylene glycol, chloro fluorocarbons, hydrofluoroethers, and liquefied gases (e.g., liquid nitrogen)).

RIE apparatus 10 also includes an evacuation pump fluidly connected to evacuation port(s) 70. This pump may be any vacuum pump, such as a Roots blower, a turbo molecular pump, a diffusion pump, or a cryopump, capable of evacuating the chamber. In addition, this pump may be assisted or backed up by a mechanical pump. The evacuation pump may be provided on apparatus 10 or alternatively may be provided as a separate system and fluidly connected to the chamber.

RIE apparatus 10 also includes a fluid feeder, preferably in the form of a mass flow controller that regulates the fluid used to create the thin film, the fluid being pumped into the chamber after evacuation thereof. The feeder may be provided on apparatus 10 or alternatively may be provided as a separate system and fluidly connected to the chamber. The feeder supplies fluid in the proper volumetric rate or mass flow rate to the chamber during etching. The etching gases can include oxygen, argon, chlorine, fluorine, carbon tetrafluoride, carbontetrachloride, perfluoromethane, perfluoroethane, perfluoropropane, nitrogen trifluoride, sulfur hexafluoride, methane, and mixtures thereof.

RIE apparatus 10 also includes a power source electrically connected to electrode 80 via electrical terminal 30. The power source may be provided on apparatus 10 or alternatively may be provided on a separate system and electrically connected to the electrode via electrical terminal (as shown in FIG. 2). In any case, the power source is any power generation or transmission system capable of supplying sufficient power. (See discussion infra.).

Although a variety of power sources are possible, RF power is preferred. This is because the frequency is high enough to form a self bias on an appropriately configured powered electrode, but not high enough to create standing waves in the resulting plasma. RF power is scalable for high output (wide webs or substrates, rapid web speed). When RF power is used, the negative bias on the electrode is a negative self bias, that is, no separate power source need be used to induce the negative bias on the electrode. Because RF power is preferred, the remainder of this discussion will focus on that type.

The RF power source powers electrode 80 with a frequency in the range of 0.01 MHz to 50 MHz, preferably 13.56 MHz or any whole number (e.g., 1, 2, or 3) multiple thereof. This RF power as supplied to electrode 80 creates a plasma from the gas within the chamber. The RF power source can be an RF generator such as a 13.56 MHz oscillator connected to the electrode via a network that acts to match the impedance of the power supply with that of the transmission line (which is usually 50 ohms resistive) so as to effectively transmit RF power through a coaxial transmission line.

Upon application of RF power to the electrode, the plasma is established. In a 15 RF plasma the powered electrode becomes negatively biased relative to the plasma. This bias is generally in the range of 500 volts to 1400 volts. This biasing causes ions within the plasma to accelerate toward electrode 80. Accelerating ions etch the article in contact with electrode 80 as is described in more detail below.

In operation, a full spool of substrate upon which etching is desired is inserted over the stem as spool 28A. Access to these spools is provided through lower door 18 since, in FIGS. 1 and 2, the spools are located in lower compartment 58 while etching occurs in upper compartment 56. In addition, an empty spool is fastened opposite the substrate holding spool as spool 28B so as to function as the take-up spool after etching has occurred.

If a spacer web is desired to cushion the substrate during winding or unwinding, spacer web delivery and/or take-up spool can be provided as spools 28C and 28D (although the location of the spools in the particular locations shown in the figures is not critical). Similarly, if etching is desired in a pattern or otherwise partial manner, a masking web can be positioned on an input spool as spool 28E and an empty spool is positioned as a take-up spool as spool 28F.

After all of the spools with and without substrates or webs are positioned, the substrate on which etching is to occur (and any masking web to travel therewith around the electrode) are woven or otherwise pulled through the system to the take-up spools. Spacer webs generally are not woven through the system and instead separate from the substrate just before this step and/or are provided just after this step. The substrate is specifically wrapped around electrode 80 in channel 90 thereby covering the exposed electrode portion. The substrate is sufficiently taut to remain in contact with the electrode and to move with the electrode as the electrode rotates so a length of substrate is always in contact with the electrode for etching. This allows the substrate to be etched in a continuous process from one end of a roll to the other. The substrate is in position for etching and lower door 18 is sealed closed.

Chamber 24 is evacuated to remove all air and other impurities. Once an etchant gas mixture is pumped into the evacuated chamber, the apparatus is ready to begin the process of etching. The RF power source is activated to provide an RF electric field to electrode 80. This RF electric field causes the gas to become ionized, resulting in the formation of a plasma with ions therein. This is specifically produced using a 13.56 MHz oscillator, although other RF sources and frequency ranges may be used.

Once the plasma has been created, a negative DC bias voltage is created on electrode 80 by continuing to power the electrode with RF power. This bias causes ions to accelerate toward channel (non-insulated electrode portion) 90 of electrode 80 (the remainder of the electrode is either insulated or shielded). The ions selectively etch the matrix material (versus the dispersed phase) in the length of substrate in contact with channel 90 of electrode 80 causing anisotropic etching of the matrix material of on that length of article.

For continuous etching, the take-up spools are driven so as to pull the article and any masking webs through the upper compartment 56 and over electrode 80 so that etching of the matrix occurs on any unmasked substrate portions in contact with annular channel 90. The substrate is thus pulled through the upper compartment continuously while a continuous RF field is placed on the electrode and sufficient reactive gas is present within the chamber. The result is a continuous etching on an elongated article, and substantially only on the article. Etching does not occur on the insulated portions of the electrode nor does etching occur elsewhere in the chamber. To prevent the active power fed to the plasma from being dissipated in the end plates of the cylindrical electrode, grounded dark space shields 86 and 88 can be used. Dark space shields 86 and 88 can be of any shape, size, and material that is conducive to the reduction of potential fouling. In the embodiment shown in FIGS. 1 and 2, dark space shields 86 and 88 are metal rings that fit over drum 26 and the insulation thereon. Dark space shields 86 and 88 do not bias due to the insulative material that covers drum 26 in the areas where dark space shields 86 and 88 contact drum 26. The dark space shields in this ring-like embodiment further include tabs on each end thereof extending away from drum 26 in a non-annular manner. These tabs can assist in aligning the article within channel 90.

Preferably, the temperature control system pumps fluid through electrode 80 throughout the process to keep the electrode at a desired temperature. Typically, this involves cooling the electrode with a coolant as described above, although heating in some cases may be desirable. In addition, since the substrate is in direct contact with the electrode, heat transfer from the plasma to the substrate is managed through this cooling system, thereby allowing the coating of temperature sensitive films such as polyethyleneterephthalate, and polyethylene naphthalate.

After completion of the etching process, the spools can be removed from shafts supporting them on the wall. The substrate with the nanostructured article thereon is on spool 28B and is ready for use.

In some embodiments, nanostructured articles described herein, the nanostructured article comprise additional layers. For example, the article may comprise an additional fluorochemical layer to give the article improved water and/or oil repellency properties. The nanostructured surface may also be post treated (e.g., with an additional plasma treatment). Plasma post treatments may include surface modification to change the chemical functional groups that might be present on the nanostructure or for the deposition of thin films that enhance the performance of the nanostructure. Surface modification can include the attachment of methyl, fluoride, hydroxyl, carbonyl, carboxyl, silanol, amine, or other functional groups. The deposited thin films can include fluorocarbons, glass-like, diamond-like, oxide, carbide, and nitride. When the surface modification treatment is applied, the density of the surface functional groups is high due to the large surface area of the anisotropically etched nanostructured surface. When amine functionality is used, biological agents (e.g., antibodies, proteins, and enzymes) can be easily grafted to the amine functional groups. When silanol functionality is used, silane chemistries can be easily applied to the nanostructured surface due to the high density of silanol groups. Antimicrobial, easy-clean, and anti-fouling surface treatments that are based on silane chemistry are commercially available. Antimicrobial treatments may include quaternary ammonium compounds with silane end group. Easy-clean compounds may include fluorocarbon treatments, such as perfluoropolyether silane, and hexafluoropropyleneoxide (HFPO) silane. Anti-fouling treatments may include polyethyleneglycol silane. When thin films are used, these thin films may provide additional durability to the nanostructure or provide unique optical effects depending upon the refractive index of the thin film. Specific types of thin films may include diamond-like carbon (DLC), diamond-like glass (DLG), amorphous silicon, silicon nitride, plasma polymerized silicone oil, aluminum, and copper.

For composites comprising, in order, a substrate, functional layer, and a nanostructured surface, the composite can be made, for example, by a method comprising:

providing a substrate having first and second generally opposed major surfaces and the functional layer having opposing first and second major surfaces, wherein the first major surface of the functional layer is disposed on the first major surface of the substrate;

coating a coatable composition comprising a matrix material and a nano-scale dispersed phase in the matrix material on the first major surface of the functional layer;

optionally drying the coating (and optionally curing the dried coating) to provide an article comprising a matrix and a nano-scale dispersed phase in the matrix;

exposing the second major surface of the article to reactive ion etching, wherein the ion etching comprises:

placing the article on a cylindrical electrode in a vacuum vessel;

introducing etchant gas to the vacuum vessel at a predetermined pressure (e.g., in a range from 1 milliTorr to 20 milliTorr);

generating plasma (e.g., an oxygen plasma) between the cylindrical electrode and a counter-electrode;

rotating the cylindrical electrode to translate the substrate; and anisotropically etching the coating to provide the random nanostructured anisotropic surface.

For composites further comprising in order relative to the substrate, a second functional layer, and a second nanostructured surface, the preceding method can be conducted, for example, by providing the substrate with the functional layer (which may be the same of different) on each major surface of the substrate, and applying the second nanostructured surface on the functional layer. In some embodiments, the second nanostructured surface is applied simultaneously with the first nanostructured surface. In some embodiments, the second functional layer is provided after the first nanostructured surface is applied, while in others, for example, during the application of the first nanostructured surface.

For composites described herein comprising, in order, a substrate, a nanostructured surface, and a functional layer, the composite can be made, for example, by a method comprising:
- providing a substrate having first and second generally opposed major surfaces;
- coating a coatable composition comprising a matrix material and a nano-scale dispersed phase in the first matrix material on the first major surface of the substrate;
- optionally drying the coating (and optionally curing the dried coating) to provide an article comprising a matrix and a nano-scale dispersed phase in the matrix;
- exposing a major surface of the article to reactive ion etching, wherein the ion etching comprises:
  - placing the article on a cylindrical electrode in a vacuum vessel;
  - introducing etchant gas to the vacuum vessel at a predetermined pressure (e.g., in a range from 1 milliTorr to 20 milliTorr);
  - generating plasma (e.g., an oxygen plasma) between the cylindrical electrode and a counter-electrode;
  - rotating the cylindrical electrode to translate the substrate; and
  - anisotropically etching the coating to provide the first random nanostructured anisotropic surface; and
- disposing a functional layer on the random nanostructured anisotropic surface.

For composites further comprising in order relative to the substrate, a second nanostructured surface, and a second functional layer, the preceding method can be conducted, for example, by applying the second nanostructured surface on the functional layer, and then disposing a functional layer (which may be the same or different) on a major surface of the second nanostructured surface. In some embodiments, the second nanostructured surface is applied simultaneously with the first nanostructured surface. In some embodiments, the second functional layer is provided after the first nanostructured surface is applied, while in others, for example, during the application of the first nanostructured surface.

There are several deposition techniques used to grow the transparent conductive films, including chemical vapor deposition (CVD), magnetron sputtering, evaporation, and spray pyrolysis. Glass substrates have been widely used for the making organic light emitting diodes. Glass substrates, however, tend to be undesirable for certain applications (e.g., electronic maps and portable computers). Where flexibility is desired, glass is brittle and hence undesirable. Also, for some applications (e.g., large area displays) glass is too heavy. Plastic substrates are an alternative to glass substrates. The growth of transparent conductive films on plastic substrates by low temperature (25° C.-125° C.) sputtering is reported, for example, by Gilbert et al., 47$^{th}$ Annual Society of Vacuum Coaters Technical Conference Proceedings (1993), T. Minami et al., Thin Solid Film, Vol. 270, page 37 (1995), and J. Ma, Thin Solid Films, vol. 307, page 200 (1997). Another deposition technique, pulsed laser deposition, is reported, for example, in U.S. Pat. No. 6,645,843 (Kim et al.), wherein a smooth, low electrical resistivity indium-tin-oxide (ITO) coating is formed on polyethylene terephthalate (PET) substrate. The electrically-conductive layer can include a conductive elemental metal, a conductive metal alloy, a conductive metal oxide, a conductive metal nitride, a conductive metal carbide, a conductive metal boride, and combinations thereof. Preferred conductive metals include elemental silver, copper, aluminum, gold, palladium, platinum, nickel, rhodium, ruthenium, aluminum, and zinc. Alloys of these metals, such as silver-gold, silver-palladium, silver-gold-palladium, or dispersions containing these metals in admixture with one another or with other metals also can be used. Transparent conductive oxide (TCO), such as indium-tin-oxide (ITO), indium-zinc-oxide (IZO), zinc oxide, with or without, dopants, such as aluminum, gallium and boron, other TCOs, and combinations thereof can also be used as an electrically-conductive layer. Preferably, the physical thickness of an electrically-conductive metallic layer is in a range from about 3 nm to about 50 nm (in some embodiments, about 5 nm to about 20 nm), whereas the physical thickness of transparent conductive oxide layers are preferably in a range from about 10 nm to about 500 nm (in some embodiments, about 20 nm to about 300 nm). The resulted electrically-conductive layer can typically provide a sheet resistance of less than 300 ohms/sq. (in some embodiments, less than 200 ohms/sq., or even less than 100 ohms/sq.). For functional layers applied to a nanostructured surface, the layer may follow the surface contour of the nanostructured surface so that the antireflection function is created at the interface between the nanostructured surface and the deposited layer, and at the second surface of the functional coating layer contacting air or the surface of another substrate.

Transparent conductive films can be made, for example, from transparent conductive polymers. Conductive polymers include derivatives of polyacetylene, polyaniline, polypyrrole, PETOT/PSS (poly(3,4-ethylenedioxythiophene)/polystyrenesulfonic acid), or polythiophenes (see, e.g., Skotheim et al., Handbook of Conducting Polymers, 1998). Although not wanting to be bound by theory, it is believed that these polymers have conjugated double bonds which allow for conduction. Further, although not wanting to be bound by theory, it is believed that by manipulating the band structure, polythiophenes have been modified to achieve a HUMO-LUMO separation that is transparent to visible light. In a polymer, the band structure is determined by the molecular orbitals. The effective bandgap is the separation between the highest occupied molecular orbital (HOMO) and lowest unoccupied molecular orbital (LUMO).

The transparent conductive layer can comprise, for example, anisotropic nano-scale materials which can be solid or hollow. Solid anisotropic nano-scale materials include nanofibers and nanoplatelets. Hollow anisotropic nano-scale materials include nanotubes. Typically, the nanotube has an aspect ratio (length:diameter) greater than 10:1 (in some embodiments, greater than 50:1, or even greater than 100:1). The nanotubes are typically greater than 500 nm (in some embodiments, greater than 1 micrometer, or even greater than 10 micrometers) in length. These anisotropic nano-scale materials can be made from any conductive material. Most typically, the conductive material is metallic. The metallic material can be an elemental metal (e.g., transition metals) or a metal compound (e.g., metal oxide).

The metallic material can also be a metal alloy or a bimetallic material, which comprises two or more types of metal. Suitable metals include silver, gold, copper, nickel, gold-plated silver, platinum, and palladium. The conductive material can also be non-metallic (e.g., carbon or graphite (an allotrope of carbon)).

Gas (e.g., water vapor and oxygen) barrier films typically comprise a relatively thin (e.g., about 100 nm to about 300 nm) layer of a metal oxide, such as aluminum oxide, magnesium oxide, or silicon oxide on a film surface. Other exemplary layers on films to provide a gas barrier film include ceramics, such as silicon oxide, silicon nitride, aluminum oxide nitride, magnesium oxide, zinc oxide, indium oxide, tin oxide, tin-doped indium oxide, and aluminum-dope zinc oxide. Gas bather films can be a single barrier layer or multiple barrier layers construction. The barrier layer may also comprise multifunctional properties such as conductive functionality.

In some embodiments, the surface of the matrix comprising the nano-scale dispersed phase may be microstructured. For example, a transparent conductive oxide-coated substrate, with a v-groove microstructured surface can be coated with polymerizable matrix materials comprising a nanodispersed phase and treated by plasma etching to form nanostructures on v-groove microstructured surface. Other examples include a fine micro-structured surface resulting from controlling the solvent evaporation process from multi-solvent coating solutions, reported as in U.S. Pat. No. 7,378,136 (Pokorny et al.); or the structured surface from the micro-replication method reported in U.S. Pat. No. 7,604,381 (Hebrink et al.); or any other structured surface induced, for example, by electrical and magnetic field.

Optionally, articles described herein further comprise an optically clear adhesive disposed on the second surface of the substrate. The optically clear adhesives that may be used in the present disclosure preferably are those that exhibit an optical transmission of at least about 90%, or even higher, and a haze value of below about 5% or even lower, as measured on a 25 micrometer thick sample in the matter described below in the Example section under the Haze and Transmission Testing for optically clear adhesive. Suitable optically clear adhesives may have antistatic properties, may be compatible with corrosion sensitive layers, and may be able to be released from the substrate by stretching the adhesive. Illustrative optically clear adhesives include those described in PCT Pub. No. WO 2008/128073 (Everaerts et al.) relating to antistatic optically clear pressure sensitive adhesive; U.S. Pat. Appl. Pub. No. US 2009/0229732A1 (Determan et al.) relating to stretch releasing optically clear adhesive; U.S. Pat. Appl. Pub. No. US 2009/0087629 (Everaerts et al.) relating to indium tin oxide compatible optically clear adhesive; U.S. Pat. Appl. Pub. No. US 2010/0028564 (Everaerts et al.) relating to antistatic optical constructions having optically transmissive adhesive; U.S. Pat. Appl. Pub. No. 2010/0040842 (Everaerts et al.) relating to adhesives compatible with corrosion sensitive layers; PCT Pub. No. WO 2009/114683 (Hamerski et al.) relating to optically clear stretch release adhesive tape; and PCT Pub. No. WO 2010/078346 (Hamerski et al.) relating to stretch release adhesive tape. In one embodiment, the optically clear adhesive has a thickness of up to about 5 micrometer.

In some embodiments, nanostructured articles described herein further comprise a hardcoat comprising at least one of $SiO_2$ nanoparticles or $ZrO_2$ nanoparticles dispersed in a crosslinkable matrix comprising at least one of multi(meth)acrylate, polyester, epoxy, fluoropolymer, urethane, or siloxane(which includes blends or copolymers thereof). Commercially available liquid-resin based materials (typically referred to as "hardcoats") may be used as the matrix or as a component of the matrix. Such materials include that available from California Hardcoating Co., San Diego, Calif., under the trade designation "PERMANEW"; and from Momentive Performance Materials, Albany, N.Y., under the trade designation "UVHC". Additionally, commercially available nanoparticle filled matrix may be used such as those available from Nanoresins AG, Geesthacht Germany, under the trade designations "NANOCRYL" and "NANOPDX".

The random nanostructured surface can effectively minimize interfacial reflection when light travels through the nanostructured surface from one medium into another medium with different refractive indices. When the nanostructured surface layer thickness is greater than 0.5 micrometer, additional interfacial reflection will be induced if the refractive index of the nanostructured surface layer is different from the substrate, which in turn can increase the total reflection of the light travelling from the substrate through the nanostructured surface layer into another medium in contact with the nanostructured surface, or vice versa. In addition, when the nanostructured surface layer thickness is greater than 0.5 micrometer, the difference in refractive index between the nanostructured surface layer and the substrate, and nanostructured surface layer thickness variation can induce undesired interference fringing appearance. Nanostructured articles comprising random nanostructured surface layer having an average thickness up to 0.5 micrometer (in some embodiments, up to 0.4 micrometer, 0.3 micrometer, 0.25 micrometer, 0.2 micrometer, 0.15 micrometer, 0.1 micrometer, or even up to 0.075 micrometer) are therefore useful creating low fringing high performance antireflective optical articles. For the use with a functional layer (i.e., at least one of a transparent conductive layer or a gas barrier layer) disposed on the random nanostructured surface, the nanostructured surface layer having an average thickness up to 0.5 micrometer (in some embodiments, up to 0.4 micrometer, 0.3 micrometer, 0.25 micrometer, 0.2 micrometer, 0.1 micrometer, 0.15 micrometer, or even up to 0.075 micrometer) can likewise minimize interference fringing and the interfacial reflection from the substrate through the nanostructured surface layer into the functional layer, or vice versa, to greatly enhance the optical performance.

Figure 5:
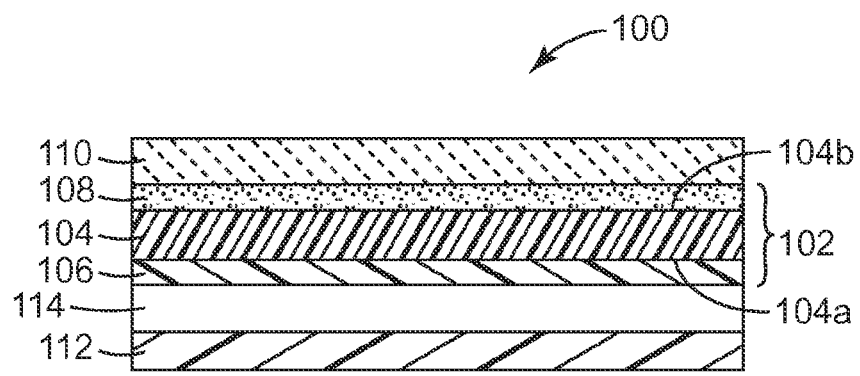
FIG. 5 is a schematic cross-sectional view of a display using an exemplary low fringing nanostructured antireflective article described herein.

FIG. 5 shows a schematic cross sectional view of an exemplary display 100 (e.g., a liquid crystal display (LCD)) using an (low fringing nanostructured antireflective) article as disclosed herein. In one embodiment, composite 102 includes transparent substrate, transparent conductive oxide-coated substrate or polarizer 104 having opposing first and second surfaces 104a and 104b with nanostructured antireflective layer 106 disposed on first surface 104a and optically clear adhesive 108 disposed on second surface 104b. Optionally a release liner (not shown) can be used to protect the optically clear adhesive and a premask (also not shown) can be used to protect the antireflective coating during processing and storage. Composite 102 is then laminated to glass substrate 110 such that optically clear adhesive 108 is in direct contact with glass substrate 110 which is then assembled to liquid crystal module 112, typically, with air gap 114 disposed between antireflective coating 106 and liquid crystal module 112.

In some embodiments, the articles described herein further comprises a surface protection adhesive sheet (laminate premasking film) having a releasable adhesive layer formed on the entire area of one side surface of a film, such as a polyethylene film, a polypropylene film, a vinyl chloride film, or a polyethylene terephthalate film to the surface of the nanostructured articles, or by superimposing the above-mentioned polyethylene film, a polypropylene film, a vinyl chloride film, or a polyethylene terephthalate film on the surface of nanstructured articles.

Exemplary Embodiments

1. An article comprising a substrate having first major surface and second, generally opposed major surfaces, and a first layer on the first major surface, wherein the first layer has a first random, nanostructured surface, and wherein the first layer has an average thickness up to 0.5 micrometer (in some embodiments, up to 0.4 micrometer, 0.3 micrometer, 0.25 micrometer, 0.2 micrometer, 0.1 micrometer, 0.15 micrometer, or even up to 0.075 micrometer).
2. The article of embodiment 1, wherein the first layer comprises a matrix and a nanoscale dispersed phase.
3. The article of embodiment 2, wherein the matrix is a polymeric matrix.
4. The article of any preceding embodiment, wherein the first, random, nanostructured surface is anisotropic.
5. The article of embodiments 4, wherein the first, random, nanostructured anisotropic surface has a percent reflection of less than 1%.
6. The article of any preceding embodiment, wherein the substrate is a polarizer.
7. The article of embodiment 6, wherein the polarizer is a reflective polarizer.
8. The article of embodiment 6, wherein the polarizer is an absorptive polarizer.
9. The article of either embodiment 6 or 7, wherein the polarizer is diffuse.
10. The article of any preceding embodiment, further comprising a functional layer disposed between the first major surface of the substrate and the first layer, wherein this functional layer is at least one of a transparent conductive layer or a gas barrier layer.
11. The article of any of embodiments 1 to 9, further comprising a functional layer disposed on the first random, nanostructured surface, wherein this functional layer is at least one of a transparent conductive layer or a gas barrier layer.
12. The article of any preceding embodiment, further comprising a second layer on the second major surface of the substrate, wherein the second layer has a random, nanostructured surface, and wherein the second layer has an average thickness up to 0.5 micrometer (in some embodiments, up to 0.4 micrometer, 0.3 micrometer, 0.25 micrometer, 0.2 micrometer, 0.15 micrometer, or even up to 0.075 micrometer).
13. The article of embodiment 11, further comprising a functional layer disposed between the second major surface of the substrate and the second layer, wherein this functional layer is at least one of a transparent conductive layer or a gas barrier layer.
14. The article of embodiment 11, further comprising a functional layer disposed on the second random, nanostructured surface, wherein this functional layer is at least one of a transparent conductive layer or a gas barrier layer.
15. The article of any of embodiments 1 to 9, further comprising an optically clear adhesive disposed on the second surface of the substrate, the optically clear adhesive having at least 90% transmission in visible light and less than 5% haze.
16. The article of any preceding embodiment, wherein an interference fringing appearance between the first layer and the first major surface of the substrate is reduced by at least 50 (in some embodiments, at least 75) percent as compared to the same article if the thickness of the first layer was 1.25 micrometer.
17. The article of embodiments 1 to 9 or 16, further comprising a pre-mask film disposed on the first random nanostructured surface.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Procedure 1—Plasma Treatment of Roll-to-Roll Samples

In the examples below, references to Procedure 1 describe the following operations.

Polymeric film to be treated placed in the cylindrical RIE apparatus depicted in FIG. 1. More specifically, the width of the drum electrode was 42.5 inches (106.3 cm) and the pumping was carried out by means of a turbo-molecular pump. Persons with skill in the art will perceive that this means that the apparatus was operating at a much lower operating pressure than is conventionally done with plasma processing.

Rolls of the polymeric film were mounted within the chamber, the film wrapped around the drum electrode and secured to the take up roll on the opposite side of the drum. The unwind and take-up tensions were maintained at 3 pounds (13.3 N). The chamber door was closed and the chamber pumped down to a base pressure of $5\times10^{-4}$ Torr. Oxygen was then introduced into the chamber. The operating pressure was nominally 10 mTorr. Plasma was generated by applying a power of 5500 watts of radio frequency energy to the drum. The drum was rotated so that the film was transported at a desired speed as stated in the specific example.

Procedure 2—Plasma Treatment of Sheet Samples

Procedure 2 was as described for Procedure 1 except that sheet samples of polymeric film were taped around the edges of the drum electrode. The drum was rotated at a constant speed and plasma treatment was then done with different lengths of time as stated in the specific example.

Procedure 3—Measurement of Average % Reflection

The result of the procedure was a measure of the average % reflection (% R) of a plasma treated surface of a film. One sample of the film was prepared by applying a black vinyl tape (obtained from Yamato International Corporation, Woodhaven, Mich., under the trade designation "200-38") to the backside of the sample. The black tape was applied using a roller to ensure there were no air bubbles trapped between the black tape and the sample. The same black vinyl tape was similarly applied to a clear glass slide of which reflection from both sides were predetermined in order to have a control sample to establish the % reflection from the black vinyl tape in isolation. When this procedure was used to measure a composite article comprising optically clear adhesives, the composite article was first pre-laminated to a clear glass slide, and then further laminated with the black tape to the glass surface.

The non-taped side of first the taped sample and then the control was then placed against the aperture of a color guide sphere (obtained from BYK-Gardiner, Columbia, Md., under the trade designation "SPECTRO-GUIDE") to measure the front surface total % reflection (specular and diffuse). The % reflection was then measured at a 10° incident angle for the wavelength range of 400-700 nm, and average % reflection was calculated by subtracting out the % reflection of the control.

Procedure 4—Measurement of Average % Transmission and Haze

The measurement of average % transmission and haze was measured using a spectrophotometer (Model 9970; obtained under the trade designation "BYK GARDNER TCS PLUS SPECTROPHOTOMETER" from BYK Gardner).

Examples 1-4

A trimethylolpropantriacrylate (TMPTA) composition comprising 50 wt. % silica nanoparticles (obtained from Hanse Chemie USA, Inc., Hilton Head Island, S.C., under the trade designation "NANOCRYL C150") was diluted with trimethylolpropantriacrylate (obtained from Sartomer, Exton, Pa., under the trade designation "SR351H") to form 20 wt. % silica nanoparticle coating solution. The 20 wt. % silica nanoparticle coating concentrate was further diluted with 70/30 methyl ethyl ketone (MEK)/methoxyl propanol to form a 2.5 wt. % solids coating solution. Photoinitiator (obtained from BASF Specialty Chemicals, Tarrytown, N.Y., under the trade designation "IRGACURE 184") was added into the solution according to the formulation in Table 1, below.

TABLE 1

| Components | Wt., grams |
| --- | --- |
| Methyl Ethyl Ketone | 10845 |
| Methoxyl Propanol | 4648 |
| TMPTA ("NANOCRYL C150") | 159 |
| Trimethylolpropantriacrylate ("SR351H") | 238 |
| Photoinitiator ("IRGACURE 184") | 7.945 |

The coating was then coated on the unprimed side of a 2 mil (50.8 micrometers) biaxially oriented polyethylene terephthalate (PET) film (obtained under the trade designation "692" from DuPont, Wilmington, Del.) by the roll to roll process using a 5 mil (127 micrometers) gap (web speed: 100 fpm (30.5 meters per minute)). The coating was dried in air at room temperature, and then subsequently it was further dried at 160° F. (71° C.) and cured with ultraviolet (UV) light via an H bulb (300 watts per linear inch; obtained from Fusion Systems, Rockville, Md.). The coating flow rate was adjusted to vary coating thickness. Coating thickness was estimated using a Scanning Electron Microscope (SEM). Coating rate (g/cm$^3$), coating thickness, and optical properties by Procedures 3 and 4 are reported in Table 2, below.

TABLE 2

| Example | Coating rate, g/cm$^3$ | Coating thickness, nanometers | Coating appearance | Transmission | Haze | Ave. % R |
| --- | --- | --- | --- | --- | --- | --- |
| 1 | 100 | 60 | Interference fringe free | 95.2 | 0.85 | 3.76 |
| 2 | 125 | 75 | Interference fringe free | 95.7 | 0.82 | 2.81 |
| 3 | 150 | 97 | Noticeable light fringe | 95.1 | 0.84 | 3.08 |
| 4 | 190 | 129 | Noticeable fringe | 93.2 | 0.77 | 4.49 |

The coating appearance, which is reported in Table 2 above, was visually inspected by laminating the uncoated side of the PET film to a black vinyl tape ("200-38").

Examples 5 and 6

Samples from Examples 1 and 2 without interference fringe were treated by reactive ion etching (RIE) according Procedure 1. The samples after RIE are interference fringe free. The average reflectance after RIE vs. treatment time is provided in Table 3, below.

TABLE 3

| | | Coating | Average % R |
| | Coating rate, | thickness, | |
| Example | g/cm$^3$ | nanometers | 60 seconds RIE | 75 seconds RIE |
| --- | --- | --- | --- | --- |
| 5 | 100 | 60 | 0.72 | 0.71 |
| 6 | 125 | 75 | 0.67 | 0.66 |

Examples 7 and 8

Examples 7 and 8 were prepared as described for Example 1, except the silica nanoparticle in the solid coating content was 30 wt %. The components for the coating formulation are provided in Table 4, below.

TABLE 4

| Components | Wt., grams |
| --- | --- |
| Methyl Ethyl Ketone | 10845 |
| Methoxyl Propanol | 4648 |
| TMPTA ("NANOCRYL C150") | 238 |
| Trimethylolpropantriacrylate ("SR351H") | 159 |
| Photoinitiator ("IRGACURE 184") | 7.95 |

The coated samples were treated by RIE as described in Examples 5 and 6, and their optical properties by Procedures 3 and 4 are provided in Table 5, below.

TABLE 5

| Example | Coating rate, g/cm$^3$ | Coating thickness, nanometers | Coating appearance | Transmission | Haze | Ave. % R |
| --- | --- | --- | --- | --- | --- | --- |
| 1 | 100 | 60 | Interference fringe free | 94.8 | 0.81 | 3.42 |
| 2 | 125 | 75 | Interference fringe free | 95.6 | 0.81 | 2.82 |

Examples 9 and 10

Samples from Examples 7 and 8 without interference fringe were treated by reactive ion etching (RIE) according Procedure 1. The samples after RIE are interference fringe free. The average reflectance after RIE vs. treatment time is provided in Table 6, below, as determined using Procedure 3.

TABLE 6

| Example | Coating rate, g/cm³ | Coating thickness, nanometers | Average % R 60 seconds RIE | Average % R 75 seconds RIE |
|---|---|---|---|---|
| 9 | 100 | 60 | 0.77 | 0.75 |
| 10 | 125 | 75 | 0.81 | 0.66 |

Examples 11-13

Four hundred grams of colloidal 5 nm silica particles (obtained from Nalco Chemical Co., Naperville, Ill., under the trade designation "NALCO 2325") was charged to a 1 quart (0.95 liter) jar. Four hundred fifty grams of 1-methoxy-2-propanol, 27.82 grams of 3-(Methacryloyloxy)propyltrimethoxy silane, and 0.23 gram of hindered amine nitroxide inhibitor (obtained from Ciba Specialty Chemical, Inc., Tarrytown, N.Y., under the trade designation "PROSTAB 5128") in water at 5 wt. % inhibitor were mixed together and added to the jar while stirring. The jar was sealed and heated to 80° C. for 16 hours to form a surface-modified silica dispersion. Solvents were removed from the mixture via rotary evaporation to form 44.3 wt. % solid solution. The solution was blended with trimethylolpropantriacrylate ("SR 351H") to form the coating of 10 wt. % 5 nm SiO₂ in the solid and further diluted with isopropyl alcohol (IPA) to 2.5 wt. % solid coating solution having the composition shown in Table 7, below.

TABLE 7

| Components | Wt., gm |
|---|---|
| Isopropyl Alcohol | 19.5 |
| 44.3 wt. % 5 nm SiO₂ solution | 0.113 |
| Trimethylolpropantriacrylate ("SR351H") | 6.94 |
| Photoinitiator ("IRGACURE 184") | 0.01 |

The resulting coating solution was applied on to the unprimed side of a 5 mil PET (obtained under the trade designation "618" from DuPont) using conventional Meyer rods (#3, #4, & #5 bar, respectively, for Examples 11-13). The coated substrate was dried at room temperature inside a ventilated hood for 15 minutes, and then cured using an H-Bulb under a nitrogen atmosphere at 50 fpm (15.2 mpm). The estimated coating thickness according to the relationship between percent solid in the coating solution and wet thickness of Meyer rods was less than 229 nm, 183 nm, and 137 nm for #3, #4, and #5 bars, respectively. Optical properties by Procedures 3 and 4 and coating appearance of the samples made from Meyer rods #3, #4, and #5 bars are reported in Table 8, below.

TABLE 8

| Example | Meyer rod | Coating thickness, nanometers | Coating appearance | Transmission | Haze | Ave. % R |
|---|---|---|---|---|---|---|
| 11 | #3 | <137 | Interference fringe free | 95 | 0.43 | 3.09 |
| 12 | #4 | <183 | Interference fringe free | 95.6 | 0.42 | 2.9 |
| 13 | #5 | <229 | Noticeable light fringe | 95 | 0.45 | 3.2 |

Examples 14-16

Samples from Examples 11-13 were treated by reactive ion etching (RIE) according to Procedure 2. The samples after RIE are interference fringe free. The optical properties after RIE vs. treatment time are provided in Table 9, below, as determined by Procedures 3 and 4.

TABLE 9

| Example | Meyer rod | Coating appearance | After 88 seconds RIE Transmission | Haze | Ave % R |
|---|---|---|---|---|---|
| 14 | #3 | Fringe free | 96.7 | 0.63 | 1.03 |
| 15 | #4 | Fringe free | 96.7 | 0.66 | 1.38 |
| 16 | #5 | Noticeable light fringe | 97.1 | 0.64 | 0.7 |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising a substrate having first major surface and second, generally opposed major surfaces, and a first layer on the first major surface, wherein the first layer comprises a matrix and a nanoscale dispersed phase and has a first random, anisotropic nanostructured surface, wherein the first, random, anisotropic nanostructured surface comprises nanofeatures having a height to width ratio of at least 10:1, wherein the nanofeatures are perpendicular to the first major surface, wherein a majority of the nanofeatures are capped with exposed nanoscale dispersed phase from the nanoscale phase in the matrix, wherein the first layer has a thickness up to 0.5 micrometer, and wherein the first, random, nanostructured anisotropic surface of the first layer itself has a percent reflection of less than 1% over the visible light range.

2. The article of claim 1, wherein the matrix is a polymeric matrix.

3. The article of claim 1, wherein the first layer has an average thickness up to 0.15 micrometer.

4. The article of claim 1, further comprising a functional layer disposed between the first major surface of the substrate and the first layer, wherein this functional layer is at least one of a transparent conductive layer or a gas barrier layer.

5. The article of claim 1, further comprising a functional layer disposed on the first random, nanostructured surface, wherein this functional layer is at least one of a transparent conductive layer or a gas barrier layer.

6. The article of claim 1, further comprising a second layer on the second major surface of the substrate, wherein the second layer has a random, nanostructured surface, and wherein the second layer has an average thickness up to 0.5 micrometer.

7. The article of claim 6, further comprising a functional layer disposed between the second major surface of the substrate and the second layer, wherein this functional layer is at least one of a transparent conductive layer or a gas barrier layer.

8. The article of claim 6, further comprising a functional layer disposed on the second random, nanostructured surface, wherein this functional layer is at least one of a transparent conductive layer or a gas barrier layer.

9. The article of claim 1, wherein the substrate is a polarizer.

10. The article of claim 9, wherein the polarizer is a reflective polarizer.

11. The article of claim 9, wherein the polarizer is an absorptive polarizer.

12. The article of claim 9, wherein the polarizer is diffuse.

13. The article of claim 1, wherein the first layer has a thickness up to 0.25 micrometer.

14. The article of claim 1, wherein the first layer has a thickness up to 0.2 micrometer.

15. The article of claim 1, wherein the first layer has a thickness up to 0.1 micrometer.

* * * * *

UNITED STATES PATENT AND TRADEMARK OFFICE
CERTIFICATE OF CORRECTION

| | | |
|---|---|---|
| PATENT NO. | : 9,435,924 B2 | Page 1 of 1 |
| APPLICATION NO. | : 14/003923 | |
| DATED | : September 6, 2016 | |
| INVENTOR(S) | : Yu et al. | |

It is certified that error appears in the above-identified patent and that said Letters Patent is hereby corrected as shown below:

In the Specification

Column 3
Line 39, delete "minor" and insert -- mirror --, therefor.

Column 7
Line 45, delete ""CΛB" and insert -- "CAB --, therefor.

Line 46, after "2095"," delete ""CΛB" and insert -- "CAB --, therefor.

Line 46, "Λ105"," and insert -- A105", --, therefor.

Line 46, after "and" delete ""CΛB" and insert -- "CAB --, therefor.

Column 14
Line 34, after "3mm))" insert -- . --.

Column 21
Line 15, delete "bather" and insert -- barrier --, therefor.

Column 24
Lines 22-29, delete "Polymeric film to be treated placed in the cylindrical RIE apparatus depicted in FIG. 1. More specifically, the width of the drum electrode was 42.5 inches (106.3 cm) and the pumping was carried out by means of a turbo-molecular pump. Persons with skill in the art will perceive that this means that the apparatus was operating at a much lower operating pressure than is conventionally done with plasma processing." and insert the same on Column 24, Line 21 as a continuation of the same paragraph.

Signed and Sealed this
Thirtieth Day of May, 2017

Michelle K. Lee
*Director of the United States Patent and Trademark Office*